(12) United States Patent
Kim

(10) Patent No.: US 11,902,326 B1
(45) Date of Patent: *Feb. 13, 2024

(54) SECURE MESSAGING INTEGRATION WITH MESSAGING APPLICATIONS

(71) Applicant: Medallia, Inc., San Francisco, CA (US)

(72) Inventor: Mansu Kim, San Mateo, CA (US)

(73) Assignee: Medallia, Inc., San Francisco, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 17/521,641

(22) Filed: Nov. 8, 2021

Related U.S. Application Data

(63) Continuation of application No. 16/197,166, filed on Nov. 20, 2018, now Pat. No. 11,171,989.

(60) Provisional application No. 62/589,417, filed on Nov. 21, 2017.

(51) Int. Cl.
*H04L 9/40* (2022.01)
*G06F 16/31* (2019.01)
*H04L 51/212* (2022.01)

(52) U.S. Cl.
CPC .............. *H04L 63/18* (2013.01); *G06F 16/31* (2019.01); *H04L 51/212* (2022.05); *H04L 63/0428* (2013.01); *H04L 63/108* (2013.01); *H04L 63/123* (2013.01)

(58) Field of Classification Search
CPC ...................................................... H04L 63/18
See application file for complete search history.

(56) References Cited

U.S. PATENT DOCUMENTS

2015/0117373 A1* 4/2015 Thies ................ H04L 51/214
370/329
2018/0089690 A1* 3/2018 Wan .................. G06Q 20/3278

* cited by examiner

*Primary Examiner* — Simon P Kanaan

(57) ABSTRACT

In an embodiment, a method for secure messaging integration with message apps includes identifying a trigger event within a default messaging channel established between a message aggregator and a messaging application executing at a client device. In response to the trigger event, the method sends to the client device over the default messaging channel, access data usable to access a secure channel established between the message aggregator and the client device. The access data is presented within the messaging application and communications over the secure channel are not visible to the default messaging channel.

20 Claims, 19 Drawing Sheets

SECURE MESSAGING INTEGRATION WITH MESSAGING APPLICATIONS

CROSS REFERENCE TO OTHER APPLICATIONS

This application is a continuation application and claims the benefit and priority to the U.S. application Ser. No. 16/197,166 that was filed on Nov. 20, 2018, which claims the benefit and priority to U.S. Provisional Patent Application No. 62/589,417 entitled METHOD AND SYSTEM FOR SECURE MESSAGE OVER MULTIPLE MESSAGING SERVICES filed Nov. 21, 2017, which are all incorporated herein by reference in their entirety

BACKGROUND OF THE INVENTION

Messaging services are used by billions of consumers every day. Example messaging services include Facebook® Messenger, WhatsApp®, Snapchat ®, WeChat®, LINE, Telegram®, Skype®, Google+ Hangouts®, Slack®, Microsoft Teams™, short message service (SMS), multimedia messaging service (MMS), rich communications service (RCS), iMessage®, and BlackBerry Messenger®. Enterprises use these services to interface with customers. However, some exchanges involve sensitive data. For example, during a Facebook®Messenger conversation between a user and a bank representative, the user may ask to check their account balance.

Enterprises may be obligated by regulations (e.g., Health Insurance Portability and Accountability Act of 1996 (HIPAA), EU General Data Protection Regulation, California Consumer Privacy Act of 2018), or internal policies to protect the information exchanged. One way that enterprises have conventionally implemented security measures is using custom-designed applications, which can access a device's native features. However, when the enterprise relies on third party messaging services such as the examples named above, they have little control over how security features are implemented. In one aspect, many messaging services do not have end-to-end encryption. In another aspect, messaging services may store and forward messages that contain sensitive information. The sensitive information is stored by a server of the third party application and thus out of the control of the enterprise although the enterprise may have a duty to protect the sensitive information.

BRIEF DESCRIPTION OF THE DRAWINGS

Various embodiments of the invention are disclosed in the following detailed description and the accompanying drawings.

DETAILED DESCRIPTION

Figure 1:
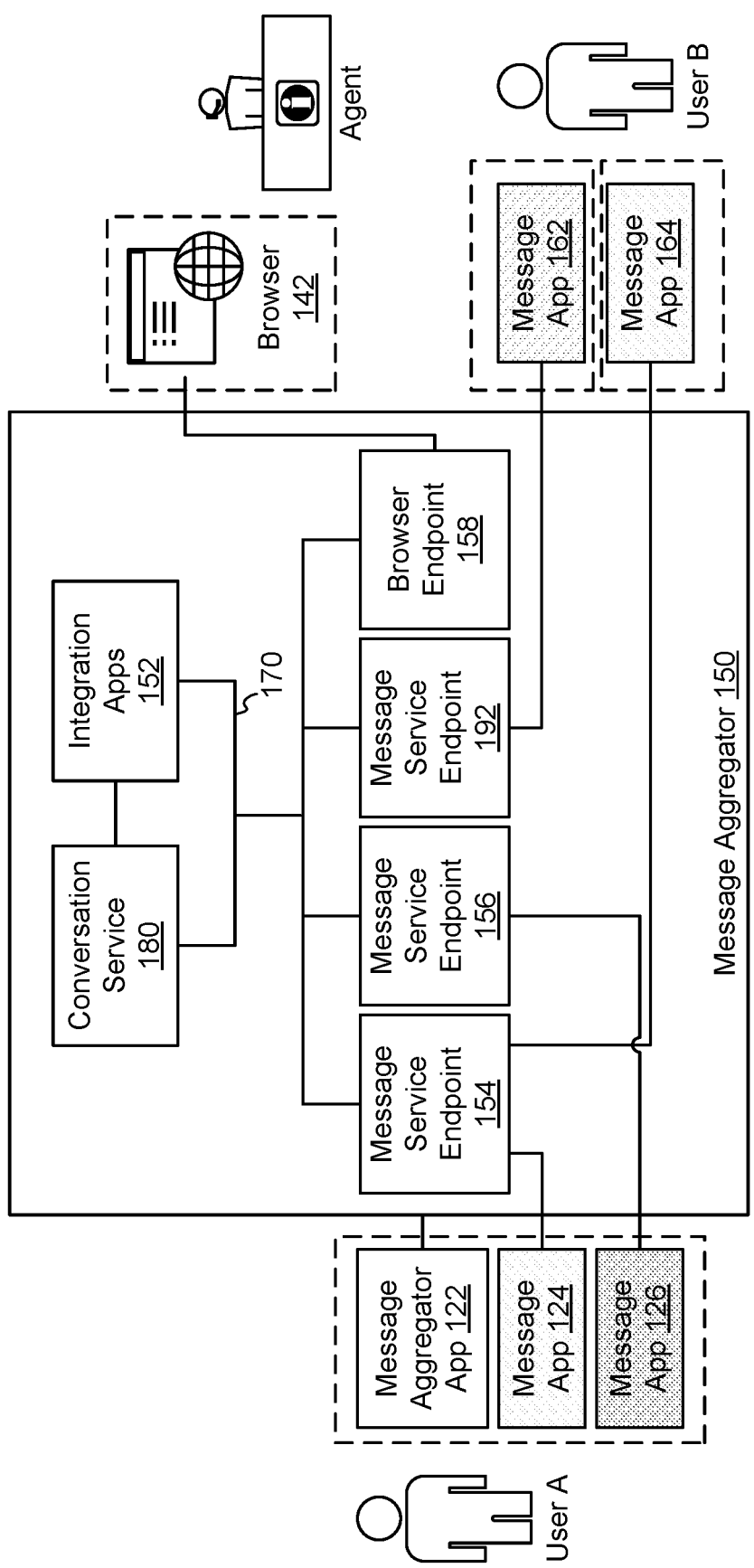
FIG. 1 is a block diagram illustrating an embodiment of a system for conversing across fragmented messaging services.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Secure messaging integration with messaging applications is disclosed. Users may converse using various different messaging services. Typically, a messaging service provides a message application (sometimes called "message app" or "messaging service specific app") to be installed on a client device application (sometimes simply called "app"). For example, Facebook® Messenger is an app, and the associated service refers to the functionalities of the app as enabled by a server that coordinates messaging between two Facebook® Messenger users who each have the app installed on their respective devices. When users wish to exchange sensitive information, the techniques described below protect the information even where messaging services may not provide adequate protection measures. User (customer) feedback can be collected using the messaging apps. For example, a service provider such as rental car agency can reach out to a customer using the customer's preferred messaging apps to follow-up during the car rental, solicit feedback (e.g., surveys), and the like.

A company may wish to contact its customers via a messaging service to solicit feedback so that it may measure customer satisfaction and improve its business operations. However, if the customer has a need to exchange personal data during the conversation that requires a higher level of data protection (such as a password, ID number, geolocation, etc) then they need to make sure that the messaging techniques allow for that higher level of data protection.

In conventional messaging services, end-to-end encryption may typically be unavailable for interactions between a consumer and an enterprise. For example, suppose a health insurance company offers two services via a third party messaging service: checking health records and playing a fitness activity game. Although the health record service is served to the customer in compliance with HIPAA, the fitness game has a lower security standard. The underlying third party messaging service can repeat (echo) transactions between the customer and the health record service to the fitness activity game, which would violate HIPAA.

In addition, most messaging services are asynchronous, meaning that services store and forward information when the recipient is not connected at the time a message is sent. The store and forward mechanism causes sensitive data to be stored for some length of time usually in a public cloud. This exposes the data to vulnerabilities if the storage is compromised or may be in violation of regulations.

Conventional techniques such as custom-built applications allow administrators to manage the security of data transmissions. However, users dislike using many different custom-built applications. The experience is not seamless because the user may need to download the other application if it is not already installed on her device. Many would prefer to use their favorite messaging app to interact online instead.

The secure messaging techniques described below have advantages over conventional techniques because they allow a user to continue to use the messaging app of his choice without needing to install custom-built applications. In other words, a user can use any messaging app to communicate (with another user, a customer service representative, etc.), including exchanging sensitive information, without feeling like the user has left the messaging app. At the same time, the sensitive information is protected. A separate (secure) channel of communication is established between a message aggregator and a device on which the messaging app is installed, as further described with respect to FIG. 5. The secure messaging techniques described below can be used to collect user information such as customer feedback including information of a sensitive nature such as passwords and the like.

First, an example of a fragmented messaging service system in which a variety of messaging applications are used by various users will be discussed.

FIG. 1 is a block diagram illustrating an embodiment of a system for conversing across fragmented messaging services. The secure messaging techniques disclosed here can be applied to this fragmented messaging system. Here, the messaging services are fragmented because there are several platforms used by Users A, B, and the agent. Platforms that are the same have the same shading. Here, Message App 124 and 164 are the same platform, but the other Message Apps are different platforms. The system includes a message aggregator 150 that supports a variety of content types and messaging platforms. Here, the message aggregator facilitates communications between three users, User A, User B, and Agent.

Message aggregator 150 is configured to receive a message from one user and route the message to another user. Each of the users may use one or more message apps or browsers installed on one or more devices. User A uses Message Aggregator App 122, Message App 124, and Message App 126; User B uses Message App 162 and Message App 164; and the agent uses Browser 142. Message Aggregator App 122 is not required for users in the system to converse across fragmented platforms. Message Aggregator App 122, like Browser 142, is but another example of a messaging platform that provides an interface for the user to communicate with other users. Each user may have a preferred messaging app, which is determined based on usage pattern or at the user's designation, e.g., the app that the user uses most frequently. In this example, User A's preferred messaging app is 124.

Message aggregator 150 includes one or more integration apps 152, one or more message/browser service endpoints (here, 154, 156, 192, and 158), and a conversation service 180. Each of the conversation service 180 and integration app(s) 152 are communicatively coupled to the message service endpoints via a message bus 170. The conversation service 180 and integration app(s) 152 can be directly communicatively coupled to each other as further described below. In various embodiments, the message aggregator is a server, e.g., a web server that supports REST API, configured to receive messages via a communications network.

Service endpoints 154, 156, 158, and 192 interface between Message Aggregator 150 and user apps 124, 126, 162, 164 and browser 142. The endpoint can be implemented by an API. For example, the endpoint can be a web hook (web server) that understands messaging platform protocols (e.g., Facebook® message protocol, Twilio® SMS inbound web hook, etc.), SMTP email inbound, web browser push notification interface, or websocket for a message aggregator app. In various embodiments, a service endpoint is configured to handle communications from a respective type of app. For example, Message Service Endpoint 154 services Message Apps 124 and 164 because 124 and 164 are the same type of message app (e.g., both are Facebook® Messenger apps). Message Apps 126 and 162 are different types of message apps; thus, Message Service Endpoint 156 services Message App 126 and Message Service Endpoint 192 services Message App 162. Browser Endpoint 158 services Browser 142. For example, JavaScript can be embedded in browser 142 as a browser add-on or Website add-on. Browser 142 communicates with Browser Endpoint 158 by serving JavaScript. In some embodiments, a REST API call connects Browser 142 with Browser Endpoint 158 directly.

Message apps 124, 126, 162, and 164 may be one of several types of available third party messaging apps such as Facebook® Messenger, iMessage®, WhatsApp®, and the like. In the example shown here, messaging apps of the same type are shaded with the same pattern. Here, Message App 124 and 164 are the same type, and thus share the same Message Service Endpoint 154. Message App 162 is a different type of messaging app and has its respective Message Service Endpoint 192. Message App 126 is yet another type of messaging app and has its respective Message Service Endpoint 154.

A user may have one or more devices on which the apps or browsers operate. For example, all of the apps shown may be installed on a single device (represented by a dashed box), or, referring to User B, User B may have Message App 162 installed on a first device, and Message App 164 installed on a second device.

The agent can simply be another user. Here, this user is called an "agent" to illustrate a use case in which customer users, User A and User B, can chat with a representative of a company, Agent 140. The agent uses a Web browser 142, which interfaces with browser endpoint 158 to communicate with User A and User B. Even though User A and User B may be using messaging platforms different from the browser, the Agent is still able to communicate with the other users because Message Aggregator 150 intercepts the message and formats them for User A and User B as further described below.

In some embodiments, User A, User B, Integration Apps 152, and Agent together form a group. A group can help make customer support more effective, especially if there are group actions and decisions to be made. For example, a user may invite another user to form a group. A discussion group may be formed to discuss a topic. A planning group may be formed to plan a trip, etc. Message aggregator 150 is configured to generate a group identification message, which is an invitation to join a group. For example, a user requests the message aggregator to generate an invitation that can be posted to social media or a Web site. In response, the message aggregator generates an invitation. The invitation can be created in various formats including, without limitation, URL (short or long) and QR code. In some embodiments, the invitation is converted to an appropriate platform-specific code such as a Facebook® parametric to allow a Facebook® user to directly join the group from Facebook® Messenger.

In some embodiments, group information is stored. One example of group information includes information associated with groups that have been created. For example, group membership (e.g., users belonging to the group), activities, and changes/history may be stored for each group. Another example of group information is information that can help identify a group. For example, a user is looking to join a group and sends identification to Message Aggregator 150. Message Aggregator 150 can look up the information provided by the user to find a matching group. Examples of group identification include text, media, location, contacts, etc.

In operation, Message Aggregator 150 (a single interface) creates a group (such as a discussion or chat group) across messaging platforms. This allows User A to message User B without requiring User B to install the same messaging platform that User A is using. This makes it both more convenient and faster for User A and User B to communicate, while each user uses their preferred messaging app.

Figure 3:
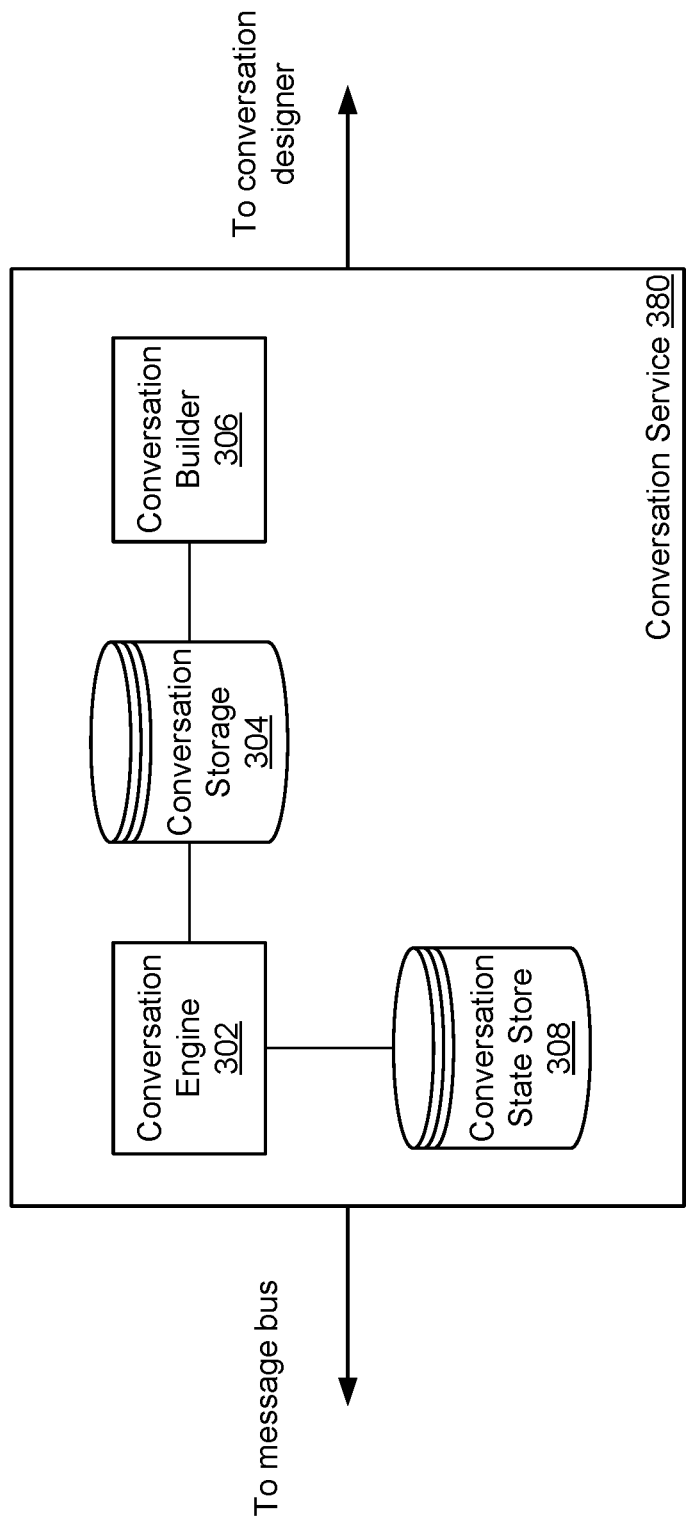
FIG. 3 is a block diagram illustrating an embodiment of a system for a conversation service.
Figure 4:
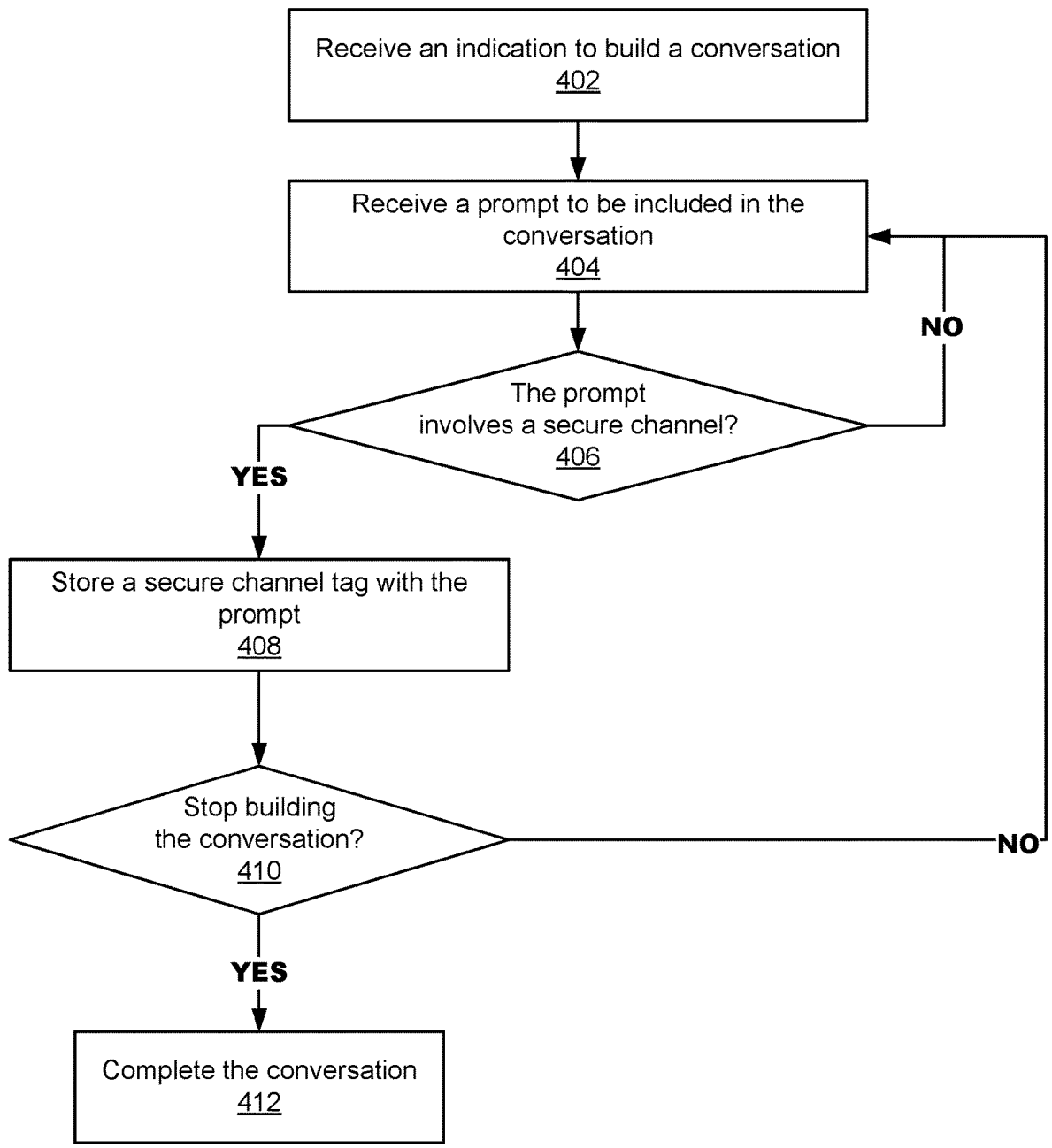
FIG. 4 is a flow chart illustrating an embodiment of a process for building a conversation template.

The conversation service 180 is configured to build conversation or dialog templates. For example, common user conversations can be handled by a chatbot and the anticipated prompts and responses in a conversation are captured in a template. Templates may be adapted to specific types of messaging apps. FIGS. 3 and 4 further discuss how a conversation is built.

Integration apps 152 provide common services to users such as user identity management and an administrative user interface. Integration apps are sometimes called automation apps, because they can automatically provide support to users. For example, an integration app can include chatbot to carry out a conversation with a user and involve live agent support if and when opportune. The integration apps can be in direct communication with conversation service 180 to look up dialogs.

Message Aggregator 150 may include a variety of integration apps to carry out a variety of functions. For example, an integration app can be configured to integrate with third party or external services such as storage like Dropbox® or Box®, commenting service such as Disqus®, business support services such as Zendesk®, Salesforce®, etc. The integration app can integrate with third party or external services by using APIs provided by those services.

Integration Apps 152 can provide a variety of services to the group. In some embodiments, an integration app implements a posting service to each messaging platform. For example, a group administrator decides to publish a discussion (or group chat) to a Facebook® group. An integration app can help with the publication by formatting the content to be compatible or optimized for the Facebook® group. For example, the integration app can use APIs provided by the messaging services to format content.

As another example, the group administrator wants to post the discussion (or group chat) to a website owned or shared between group members instead of only keeping the conversation on the messaging platform. An integration app can automatically post the discussion to the website by making a REST API call, formatting the discussion text as an HTML and uploading to a web server, etc.

For both examples described above, an individual user has the ability to choose whether their message will be posted to a public (e.g., Facebook®) group or website. In some embodiments, even if a user allows comments to be posted to a public group or website, comments can be posted anonymously at the channel-level to protect a user's identity.

In some embodiments, an integration app is configured to provide notifications to users of online communities, such as an online course. Members of an online discussion group such as a class discussion board or an assignment uploading platform receive posts through their preferred messaging platform. Each member can interact with the online discussion group using their preferred messaging platform without needing to create a new account for the class discussion board. Interactions include, without limitation, commenting, rating, editing, and using available online forum functions. In other words, students may use different messaging platforms, and the integration app will intercept these messages and format them to the appropriate messaging formats of the recipients or other members of the group. This allows a student to contribute to the discussion using a messaging platform they are accustomed to. For example, a teacher receives assignments on an online platform, and the integration app notifies the teacher through his preferred messaging platform. For example, the teacher receives a calendar invitation with the student's assignment as an attached file in Microsoft Outlook®. Through his preferred messaging platform, the teacher can comment and grade the assignments without needing to use the class discussion board website.

In some embodiments, an integration app suggests content for publishing to a group, and the suggested content can be reviewed by a group administrator or other group member. In one aspect, the automatic content suggestion can help keep a community engaged.

For example, based on the content of a group's discussion, the integration app selects recommended content. Before publishing the recommended content, in various embodiments, the content is provided to a moderator, administrator, or other user for review. The reviewer can choose whether to publish that content or not, and can edit or select portions of the content for publishing. For example, if User A posted news about "changes of patent law" to a patent discussion group and the integration app detects news related to patent legislation or cases, the integration app can recommend the news to User A. This way, the message aggregator can engage User A while inviting other users to come back to the channel to read the news. In some embodiments, a service provider can promote products by injecting content into the discussion. An integration app can use the group chat discussions or group's content engagement to choose a most appealing promotion.

In some embodiments, an integration app is configured to provide cross-group content promotion. For example, when a first group has a lot of discussion (e.g., posts exceeding a threshold) around a topic, "changes of patent law" by User A, the integration app may ask the group (e.g., User A) for redistribution rights to distribute the information to a second group who is interested in the topic or related topics. This recommendation promotes the groups to each other by making them aware of their mutual interest in "changes of patent law."

In some embodiments, an integration app is configured to provide services not native to a user's messaging platform. For example, the integration app can provide its own voice-to-text service to group users. Suppose a device transcribing service (text-to-voice service (e.g., Siri)) only works on certain types of messaging platforms and not on other messaging platforms. For example, a device may try to transcribe the text from the whole screen when a user wants to listen to each message only. The integration app can solve this problem by performing the transcription and providing text-to-voice content if the user prefers to receive a message as audio instead of text. This way, the user does not need to wait until a device transcribing feature is implemented for her preferred messaging app. Messaging apps sometimes have platform-specific stickers that work only within the messaging platforms. To integrate platform-specific stickers, in various embodiments, a service endpoint fetches a platform-specific sticker in image format to transfer to other messaging platforms.

In some embodiments, an integration app keeps track of user contributions to a group discussion. For example, the integration app assigns and maintains a user's sharing score or engagement score, which can be publicly displayed, and may improve a user's engagement by motivating him to increase his score.

In some embodiments, an integration app is configured to provide content to a shared file service such as Dropbox®, Box®, or SkyDrive®. The content uploaded to the shared file service can be accessed by a user such as a group administrator for review and sharing with the group. For example, group administrators can share data with businesses for a common project (e.g., home improvement). Suppose a homeowner starts an online group to work with a painting contractor and shares home photos with the painting contractor. While painting, the painter notices that a wall should be fixed. The home owner can then add a handyman, arrange a fix date, and share the information such as a photo of the wall to be fixed. Each user can configure where their attachment files are to be exported to automate the file-sharing process instead of manually forwarding the files to the destination. In some embodiments, when a new file is posted to the shared file service, the group is notified. In various embodiments, a file can be copied to a message aggregator (such as message aggregator 150 of FIG. 1) to serve to group members. An original file location is used, in various embodiments, to allow access control to the file.

In some embodiments, an integration app is configured to service an email gateway application. The email gateway application receives an email message, and can post the email to the group. For example, if a group is related to the real estate market, the group can collectively subscribe to a real estate news provider using the group's email address (e.g., group1@abc.co). When the real estate news provider sends a message to the group's email address, the message will be delivered to individual group members in a message format preferred by each individual member. Depending on group preferences, the integration app can be configured to handle inbound emails to the group or distribute emails to external parties on behalf of the group. If an email contains an attachment, the attachment may be provided as a link in the format of the messaging channel preferred by a recipient user. In some embodiments, the attachment may be sent directly instead of as a link. In various embodiments, a user can respond to inbound emails by messaging. A response to the inbound email can be composed by the user in her preferred messaging app, formatted as an email by the integration app, and sent as an email.

Message aggregator 150 can be implemented by a hardware device or software device, such as ASIC or the like. In one aspect, the message aggregator improves the functioning of a computer network by more efficiently routing messages between devices. In another aspect, the message aggregator improves the technical field of telecommunications by delivering content between devices, messaging platforms, and apps that are not otherwise compatible.

The system shown in FIG. 1 may include additional optional components (not shown here) to help with group identification or formation. In some embodiments, a discovery engine connects users with possible interests, social media, commenting services, and automation apps. For example, the discovery engine consults third party directories such as Facebook business directory or Apple iMessage® business directory to connect users to businesses based on user activity and demonstrated interests. The discovery engine can be used to find a group corresponding to an invitation that brought the user in the first place. Groups can be found based on a URL, QR code, Browser add-on, text, and media. In some embodiments, users, services, and groups can be discovered via directories. Directories may be established by messaging platforms such as Facebook® business directory or iMessage® business directory. A user can find a business name using these directories.

The number and types of users shown here is merely exemplary and is not intended to be limiting. Members of the group are able to communicate with each other without needing to use the same messaging platform.

A message service endpoint or browser endpoint can be implemented by the system shown in the following figure.

Figure 2:
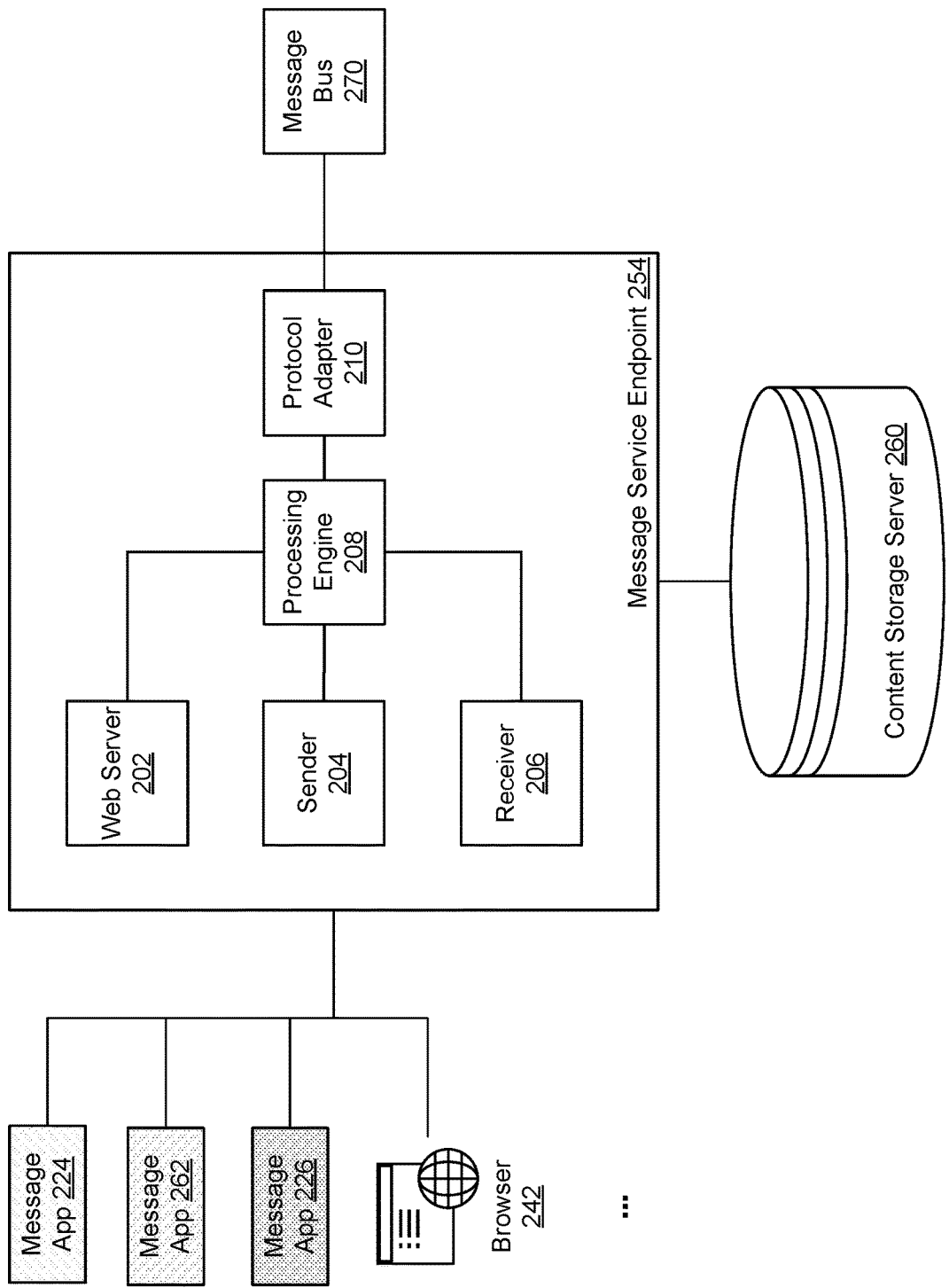
FIG. 2 is a block diagram illustrating an embodiment of a system for a message service endpoint.

FIG. 2 is a block diagram illustrating an embodiment of a system for a message service endpoint. The message service endpoint (sometimes called "endpoint" for simplicity) services one or more message apps (here, 224, 262, 226, or browser 242). In some embodiments, one endpoint services one type of message app as shown in FIG. 1. An endpoint may be configured to communicate with a specific type of app using app-specific APIs. Examples of messaging apps include iMessage®, Facebook® Messenger, WhatsApp®, WeChat®, LINE, KIK Messenger, text messaging (SMS/MMSD), and Rich Communications Services (RCS).

The message service endpoint includes a Web server 202, sender 204, receiver 206, processing engine 208, and protocol adapter 210. The Web server 202 is configured to communicate directly with a client device without using a message app. The Web server can be implemented by a Web socket or a Web hook that is a TCP application listening on a port of the server for transport layer communications. The Web server provides services such as web pages, web sockets, or web hooks by using secure transport communication (e.g., TLS, SSL, and the like). The Web server can be configured to exchange data between the message service endpoint and a client device over a secure channel (not shown) as further described with respect to FIG. 5. For example, the secure channel server 504 is an example of a Web server.

Returning to FIG. 2, sender 204 is configured to send data to message apps. Receiver 206 is configured to receive data from message apps. The message service endpoint can translate received messages to generic content (e.g., agnostic to messaging service specific apps) before passing on the data to message bus 270. Conversely, information can be formatted so that sender 204 sends a message adapted for a specific type of message app.

Processing engine 208 is configured to manage message sending and receiving. For example, the processing engine maintains a queue of messages to ensure proper ordering of message transactions. The processing engine can collect metadata related to messaging interactions. For example, if a mobile device is permitted to access content but a desktop app is not permitted, the processing engine collects metadata about what type of device made a request to determine whether to permit access to the content. In some embodiments, the processing engine implements rules to handle different types of messages. Secure messages (those with sensitive information) can be handled differently from default messages for example. Table 1 below lists some examples of rules corresponding to types of information (e.g., message, content, response). The brackets indicate parameters that can be defined or adjusted by an administrator and/or pre-defined by the system.

TABLE 1

| Type | Rule(s) |
|---|---|
| Message | Deliver after: [specified time]<br>Retries: [n attempts]<br>Maximum retries: [n attempts]<br>Expire if receive message: [true/false] |
| Content | Secure delivery: [true/false]<br>Allow access from: [network labels]<br>Number of allowed accesses: [n times]<br>Expire after: [time]<br>Source URL: [link] |

TABLE 1-continued

| Type | Rule(s) |
|---|---|
| Response | Secure response: [true/false]<br>Response challenges map: [challenge map]<br>Response challenge: [challenge protocol]<br>Secure response URL: [link to receive response securely]<br>Secure response allow access from: [network labels] |

The processing engine includes shared memory that can be accessed by Web server 202, sender 204, and receiver 206 so that states can be shared.

Figure 6:
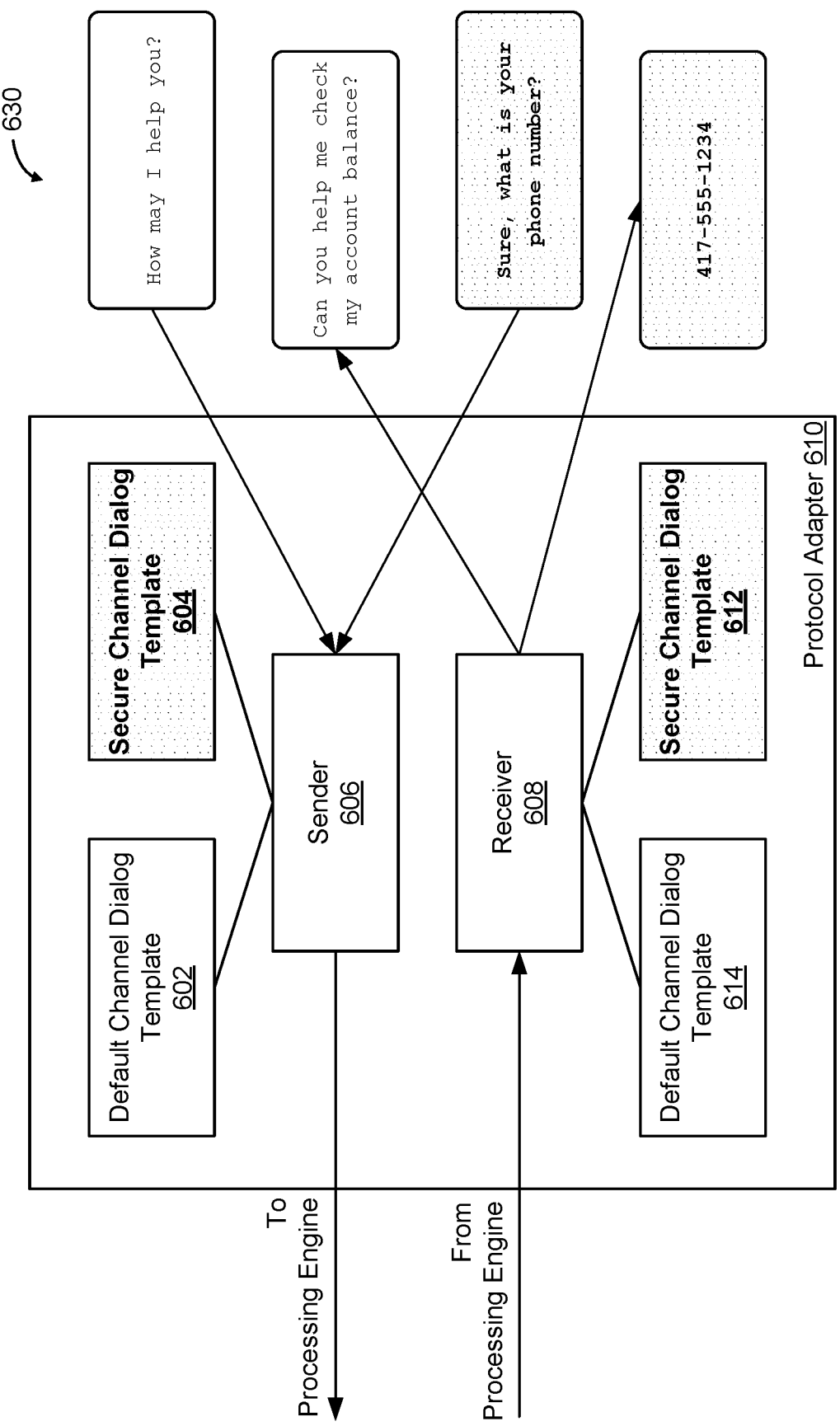
FIG. 6 is a block diagram illustrating an embodiment of a protocol adapter for secure messaging integration with messaging applications.

Protocol adapter 210 is configured to adapt information for specific message apps. One message app may expect data to be presented in a certain format (e.g., supports emojis) or may have functionalities different from another message app. Two different message apps have different protocols if they handle (present, read) information differently. The protocol adapter 210 enables message aggregator 150 to be able to interact with various different types of message apps because content is formatted by the protocol adapter. Protocol adapter 210 may store dialog templates, where a template is specific to a specific type of message app. For example, a support agent may carry out a conversation with a user and provide three options A, B, and C to the user. The protocol adapter configures the options to be presented in a way specific to the message app (e.g., three buttons in a row). FIG. 6 shows an example of a protocol adapter.

In some embodiments, message service endpoint 254 is communicatively coupled to content storage server 260. The message service endpoint can read from and write to content storage service 260. Content storage service 260 may be configured to store multimedia that has been received from or is to be sent to the message apps. In some embodiments, the content storage service stores access data and is configured to periodically remove the access data so as to ensure security of the access data.

Messages can be sent and received via message bus 270, which corresponds to message bus 170. For example, integration apps 152 and conversation service 180 may communicate with message service endpoint via the message bus.

As described with respect to FIG. 1, integration apps 152 can serve predefined conversations. A conversation is made up of one or more dialogs, which may be served in sequence or served based on user reactions or choices. Conversation 630 of FIG. 6 is an example. The integration app asks, "How may I help you?" The user responds, "Can you help me check my account balance?" The integration app then asks the user "Sure, what is your phone number?" and the user responds with her phone number. Here, each bubble is a dialog, and together the four bubbles form a conversation. A dialog may involve a secure item. In conversation 630, the dialog "Sure, what is your phone number?" is expected to elicit a response with sensitive information (a user's telephone number). Thus, it is tagged as involving a secure item. The secure dialogs are represented with a shaded background. A dialog can have the content of the message to be sent, multimedia (e.g., QR code), and expected responses. Whether a dialog includes a secure item can be specified at the time a conversation is built. The following figures show an example of a conversation service and process for building a conversation.

FIG. 3 is a block diagram illustrating an embodiment of a system for a conversation service. The conversation service 380 includes a conversation builder 306, conversation storage 304, conversation engine 302, and conversation state store 308.

The conversation builder 306 is configured to assemble a conversation made up of dialogs. The conversation can be a script used by an automated conversation bot and/or a live agent to provide customer support. Conversations can be designed by a computer processor, by a conversation designer (e.g., a human), or a combination of both. For example, conversations can be designed automatically using conventional machine learning techniques that mimic natural language to formulate questions and answers based on a common theme (e.g., soliciting responses for a survey). Conversations may be designed by a human-computer interaction specialist or other developer.

Conversations can be stored in storage 304, and selected by integration apps or live agents and used to interact with users. Conversation engine 302, in cooperation with integration apps 152, is configured to carry out a conversation with a user. For example, a conversation engine may serve up dialogs of a selected conversation to an integration app. A conversation may be like a decision tree and have several possible outcomes. The conversation engine may receive responses and carry out the conversation. The state of a conversation is stored in conversation state store 308. In some embodiments, conversation engine 302 delivers an entire conversation to integration apps 152, and it is the integration apps 152 that carry out the conversation (including possibly traversing branches of a conversation tree). In various embodiments, conversation store 308 is configured to store binary data types such as video, audio, photo, etc.

Suppose a user books a rental car from a rental car agency a few weeks before her trip. At the time of booking, the user indicates that her preferred messaging service is Facebook Messenger®. The rental car agency or its software provider can record this preference and chiefly interact with the user via her preferred messaging service. More specifically, an integration app of the message aggregator can store the user's preferences. A conversation may proceed as follows: a few days before the trip, the rental car agency sends the user a reminder of her rental car booking via Facebook Messenger®, and provides add-on options inside Messenger. For example, she can be offered insurance, a car seat, GPS, etc. According to the conversation script, after the user picks up the car and a day into the trip, the integration app sends a Facebook® message to the user on behalf of the rental car agency checking to see if everything is going well. Suppose the user messages back that the air conditioning is not cold enough. The integration app detects that the user has flagged an issue and can bring in a support agent to help resolve the AC issue.

Interaction with a user can be made up of several conversations. For example, after the AC issue is resolved, the integration app may provide additional follow up, for example by automatically sending a survey using another conversation script.

FIG. 4 is a flow chart illustrating an embodiment of a process for building a conversation template. For example, conversation service 380 may implement the process shown here to build a conversation.

At 402, the process receives an indication to build a conversation. One way the conversation building is initiated is when a conversation designer indicates on a user interface to begin building a new conversation.

At 404, the process receives a prompt to be included in the conversation. A conversation is made up of dialogs (also sometimes called prompts) such as "How may I help you?" or "Please verify your identity by typing in your PIN." Prompts may include questions, statements, instructions, and the like.

At 406, the process determines that the prompt involves a secure channel. A prompt that involves a secure channel is one that exchanges information that would benefit from being exchanged over a secure channel (e.g., that is provided by the integration service/app) rather than a default channel (e.g., that is provided by the messaging service and may not be secure such as being able to provide end-to-end encryption) such as bank account details. A prompt that involves secure content is one that asks for (potentially) sensitive information, and is expected to elicit (potentially) sensitive information or otherwise signals that sensitive information is being exchanged or will be exchanged. The process may make this determination by assessing the content of the prompt. For example, using conventional natural language processing techniques, the process determines that certain keywords or phrases indicate that secure content is involved. As another example, the process may make this determination based on a tag associated with the prompt. For example, a conversation designer formulating the prompt tags it as involving a secure channel.

In some embodiments, the received prompt may be accompanied by one or more rules associated with presenting the prompt. For example, at least part of the content of the prompt may expire after a pre-defined time period. Table 1 above lists some examples of rules. For example, a message is delivered after a specified time, delivery is attempted for a pre-defined number of times, and expires upon receipt.

If the prompt involves a secure channel, the process proceeds to 408, in which the process stores a secure channel tag with the prompt. The secure channel tag is an indication that the prompt involves a secure channel. The tag will be used as further described with respect to FIG. 6 to handle the prompt using a secure channel instead of a default channel. This ensures information security by sending sensitive information over a secure channel instead of a default channel.

Otherwise, if the prompt does not involve a secure channel, the process returns to 404 to receive or formulate a next prompt to be included in the conversation. In this way, the process continues to build the conversation.

At 410, the process determines whether to stop building the conversation. For example, a conversation designer may indicate that a conversation is complete via a user interface. As another example, an automatic conversation builder may determine, using conventional machine learning techniques, that a conversation has naturally concluded. Responses from a user such as "Thank you for your help, that's all I need today" signal that a conversation is complete. If the process determines to stop building the conversation, the process completes the conversation (412). For example, the conversation may conclude with an appropriate sign off such as "My pleasure," or a handoff such as "Anytime. If you have a few moments, will you complete a brief survey about our interaction today?" In some embodiments, completing the conversation includes instructing a user interface to update by closing a window associated with a secure channel. Otherwise, if the process determines to continue building the conversation, it returns to 404 to receive a next prompt.

The following figure shows an example of a secure channel that is established to handle those prompts/dialogs in a conversation involving the secure channel as well as messages with secure content.

Figure 5:
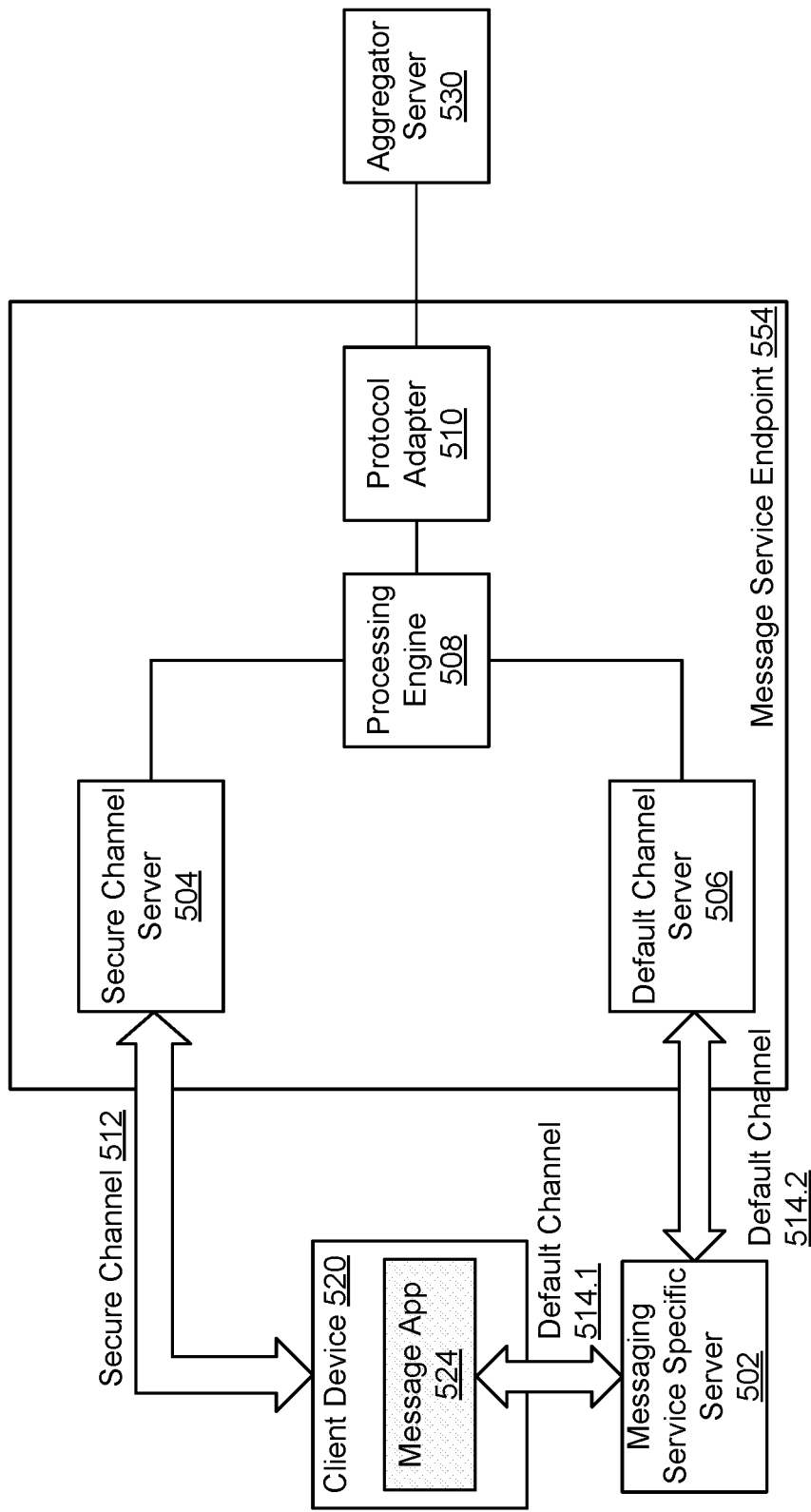
FIG. 5 is a block diagram illustrating an embodiment of a system for secure messaging integration with messaging applications.

FIG. 5 is a block diagram illustrating an embodiment of a system for secure messaging integration with messaging applications. The system includes a message service endpoint 554 and a client device 520. The message service endpoint is an example of the one shown in FIG. 2.

The message service endpoint 554 includes a protocol adapter 510, processing engine 508, secure channel server 504, and default channel server 506. The protocol adapter 510 and processing engine 508 are like their counterparts in FIG. 2. The protocol adapter 510 is served by aggregator server 530, which is associated with message aggregator 150.

The default channel (made up of segment 514.1 between the message app 524 and the messaging service specific server 502 and segment 514.2 between the messaging service specific server and the default channel server 506) is a channel between endpoint 554 and client device 520 that uses messaging service specific server 502 as an intermediary. The default channel server 506 interfaces with the default channel. The default channel 514.2 may not be secure in that, for example, messages passed over it are not encrypted and/or are not stored in encrypted form at the messaging service specific server 502 because the messaging service specific server 502 may not provide end-to-end encryption.

The secure channel server 504 is configured to handle communications over secure channel 512. Secure channel 512 is a direct channel established between the message service endpoint 554 and client device 520. The secure channel is secure because no data is stored by a third party server and/or data is encrypted prior being transported over the secure channel. Instead, interactions are served by endpoint 554, sometimes with the help of aggregator server 530. The message aggregator 150 has full control over the aggregator server 530 and the endpoint in contrast to the messaging service specific server 502, which is under control of the messaging service associated with message app 524.

In some embodiments, secure channel server 504 collects metadata associated with communications made over the secure channel. For example, when server 504 receives a message from a user, the server gathers related data and sends at least some of the data (or a processed version of the data) to integration apps 152. This can be helpful for the integration apps to determine how to help, e.g., what conversation script to use next. Examples of metadata include, without limitation, browser cookie, remote IP address, browser metadata, message delivery status (delivered, read), control information (handover, echo, blocked), sender phone number, device type/model, geographical location, app platform information, OS version, and SDK-related information.

Content transmitted over the secure channel does not pass through a server 502 associated with the messaging service specific application (message app) 524. In some embodiments, the default messaging channel and the secure channel are on different network layers. For example, the secure channel is on transport layer 4 (e.g., SSL), while the default messaging channel is on application layer 7.

In some embodiments, the default messaging channel and the secure channel use different encryption keys on the same transport layer protocol. For example, the secure channel's encryption key is between the browser on the device and secure channel server 504, while Default Channel 514.1 and 514.2 use another encryption key. For secure content, additional encryption can be applied. For example, a user's secure information can be AES encrypted to provide additional protection.

The secure channel can be associated with the default channel so that the user experience is seamless. For example, when a secure channel is closed, communications automatically revert back to the default messaging channel. In some embodiments, the secure channel and the default messaging channel are associated by an ID. In other words, the secure channel has a session ID to associate the secure channel with the default messaging channel. FIGS. 12A-12D show example user interfaces in which communications revert back to the default messaging channel following closure of the secure channel.

In operation, messages are transmitted between the endpoint 554 and client device 520 via the default channel. A message is received by default channel server 506, queued by processing engine 508, and adapted by protocol adapter 510 into generic content so that users in a conversation group using another type of message app see messages in their preferred app as if the sender were using the same type of message app. The reverse path is traversed to send a message. When a message (e.g., a dialog or prompt within a conversation such as built using a process such as the example process shown in FIG. 4) involves (potentially sensitive) information such as when a secure tag is detected, the message is transmitted over the secure channel instead of over the default channel. This way, message service endpoint 554 can ensure data security including compliance with regulations while also providing a seamless interface for the user. For example, messages sent over the secure channel are rendered in a secure window embedded into the message app or in a new/separate secure window automatically displayed next to or over the message app, as further described with respect to FIG. 9. As such, an enterprise representative (e.g., a chatbot or an agent) may send messages using the endpoint 554 to a user's message app (e.g., the message app 524) alternatively using the secure channel 512 (e.g., when a message associated with a secure tag is to be sent) and the default channel 514.2 (e.g., when a message that is not associated with a secure tag is to be sent), as appropriate.

The following figure shows an example of a protocol adapter.

FIG. 6 is a block diagram illustrating an embodiment of a protocol adapter for secure messaging integration with messaging applications. The protocol adapter 610 is an example of the one shown in FIG. 2. The protocol adapter includes a default channel dialog template engine 602, a secure channel dialog template engine 604 for sender 606, and a corresponding set (612, 614) for the receiver 608.

The sender 606 and receiver 608 are communicatively coupled to a processing engine such as the one shown in FIG. 2. The sender 606 is configured to process outbound messages according to a channel queue and messaging schedule. Parameters of the channel queue and messaging schedule can be pre-defined or defined by an administrator. Similarly, the receiver 608 is configured to process inbound messages according to a channel queue and schedule. The receiver forwards the messages to a processing engine, which may then pass messages destined for other users in a conversation group.

FIG. 6 also shows an example of a conversation 630 that is handled by the protocol adapter. The messages intended for a user "How may I help you?" and "Sure, what is your phone number?" are sent by sender 606. The messages received from the user are handled by the receiver 608. Some of the messages may involve a secure channel, as indicated by the shading of the dialog bubble. These secure messages are transmitted over a secure channel and processed using secure channel dialog template 604 or 612, while other (default) messages are transmitted over a default channel and processed by the default channel dialog template 602 or 614.

In this example, there are four engines (602, 604, 612, and 614), which is one set for sending (606) and one set for receiving (608). In other embodiments, there may simply be a single set (two engines) that services both sending and receiving. The template processing engines handle the indicated type of dialog (default/non-secure or secure).

The following figure shows an example of a process for operating the systems described previously to provide secure messaging integration.

Figure 7:
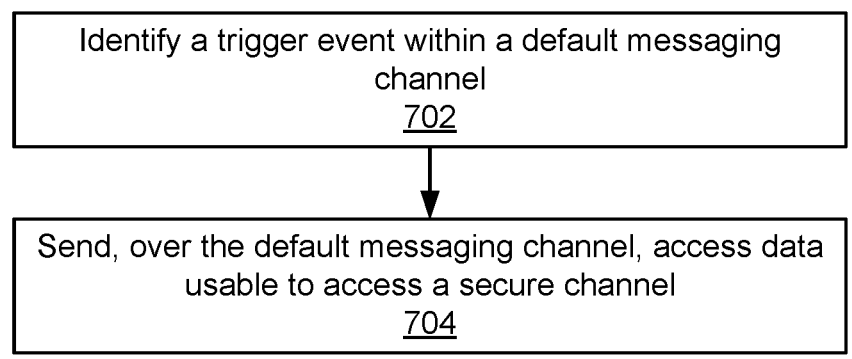
FIG. 7 is a flow chart illustrating an embodiment of a process for secure messaging integration with messaging applications.

FIG. 7 is a flow chart illustrating an embodiment of a process for secure messaging integration with messaging applications. A message service endpoint such as the one shown in FIG. 2 can perform this process. The process provides secure message delivery over various messaging services while providing flexibility to enterprises to connect customers over different types of messaging apps such as the customer's favorite messaging app. When an enterprise wishes to obtain secure input from a customer (e.g., social security number or password) or deliver a secure message to a customer (e.g., banking record, health care images), the process selects a data security compliant option, and seamlessly connects with the customer via the compliant option to complete the task while minimizing disturbance to the user experience.

Data security compliant options refer to various ways to connect with the customer that are compliant with privacy regulations, company data protection policies, and the like. For example, one type of communication that may be data security compliant is communication that provides end-to-end encryption. For example, if a third party messaging service is data security compliant, then the communications may continue via the third party messaging service. However, if the third party messaging service is not data security compliant (e.g., does not provide end-to-end encryption), then the process below sets up a secure channel over which sensitive information can be shared.

Figure 9:
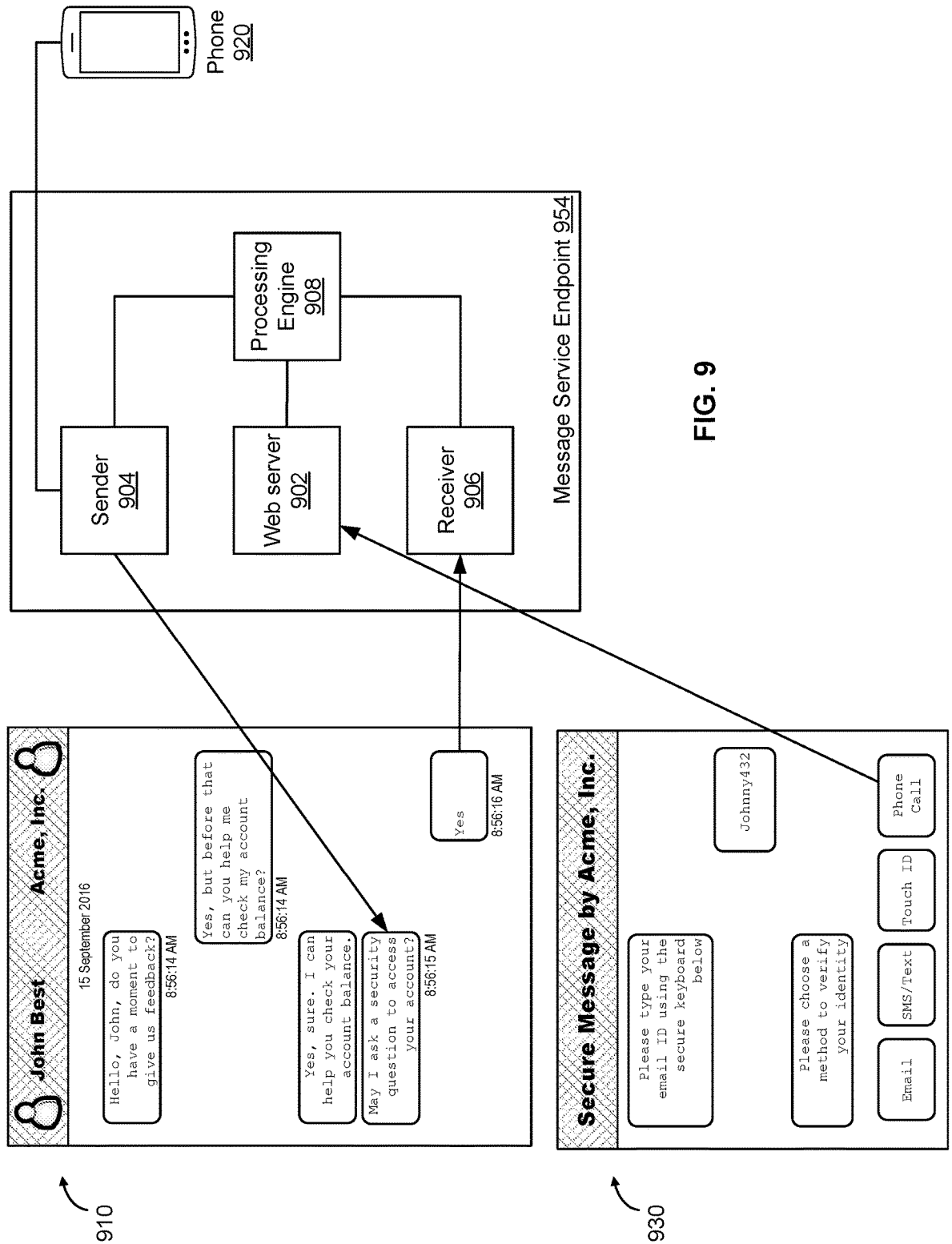
FIG. 9 is a block diagram illustrating an embodiment of a message service endpoint configured for an authentication challenge.

At 702, the process identifies a trigger event within a default messaging channel. The default messaging channel is established between a message service endpoint and a messaging service specific application executing at a client device. Referring to FIG. 5, the default channel made up of sections 514.1 and 514.2 connect the message service endpoint 554 and message app 524 (which is a messaging service specific application). Referring now to FIG. 9, communications over a default messaging channel are shown in window 910 of the example GUI of a message app. Returning to FIG. 7, a trigger event is an action or message in the default messaging channel indicating that sensitive data is expected to be exchanged. By identifying the trigger event, the process can prepare to securely transmit the sensitive information between the message service endpoint and messaging service specific application.

In some embodiments, the trigger event includes a message containing secure content. The secure content can be identified by detecting a secure channel tag in the message. For example, a support agent and user may be engaged in a conversation where the support agent carries the conversation using a conversation template. As described with respect to FIGS. 3 and 4, the conversation is made up of dialogs, and dialogs may be tagged with a secure channel tag to indicate that the dialog includes or is expected to elicit an exchange of sensitive information.

At 704, in response to the trigger event, the process sends, over the default messaging channel, access data usable to access a secure channel. The access data is sent to the client device and presented within the messaging service specific application. Referring again to FIG. 5, the secure channel 512 is a channel established directly between the message service endpoint 554 and the client device 520. Unlike the default channel, the secure channel does not pass through a third party server (here the messaging service specific server 502), thus information sent over the secure channel is not stored in a server that is beyond the control of the message service endpoint 554. Put another way, the messaging service specific server 502 does not serve as an intermediary in between the client device and the message service endpoint 554. Communications over the secure channel are not visible to the default messaging channel.

The access data presented within the messaging service specific application allows a user to access the secure channel. In some embodiments, the access data includes instructions for rendering an embedded secure window in the GUI of the client device. The instructions can be automatically carried out by the client. Referring to FIG. 12B, access data causes embedded secure window 1210 to be rendered in the GUI. The embedded secure window 1210 appears to be a part of the rest of the GUI, where the rest of the GUI corresponds to communications over a default channel. Communications over the secure channel are shown within secure window 1210 and not visible to the default channel. This provides a seamless user experience because the user does not feel that he has left the messaging app while communications are securely made over a secure channel.

Figure 14:
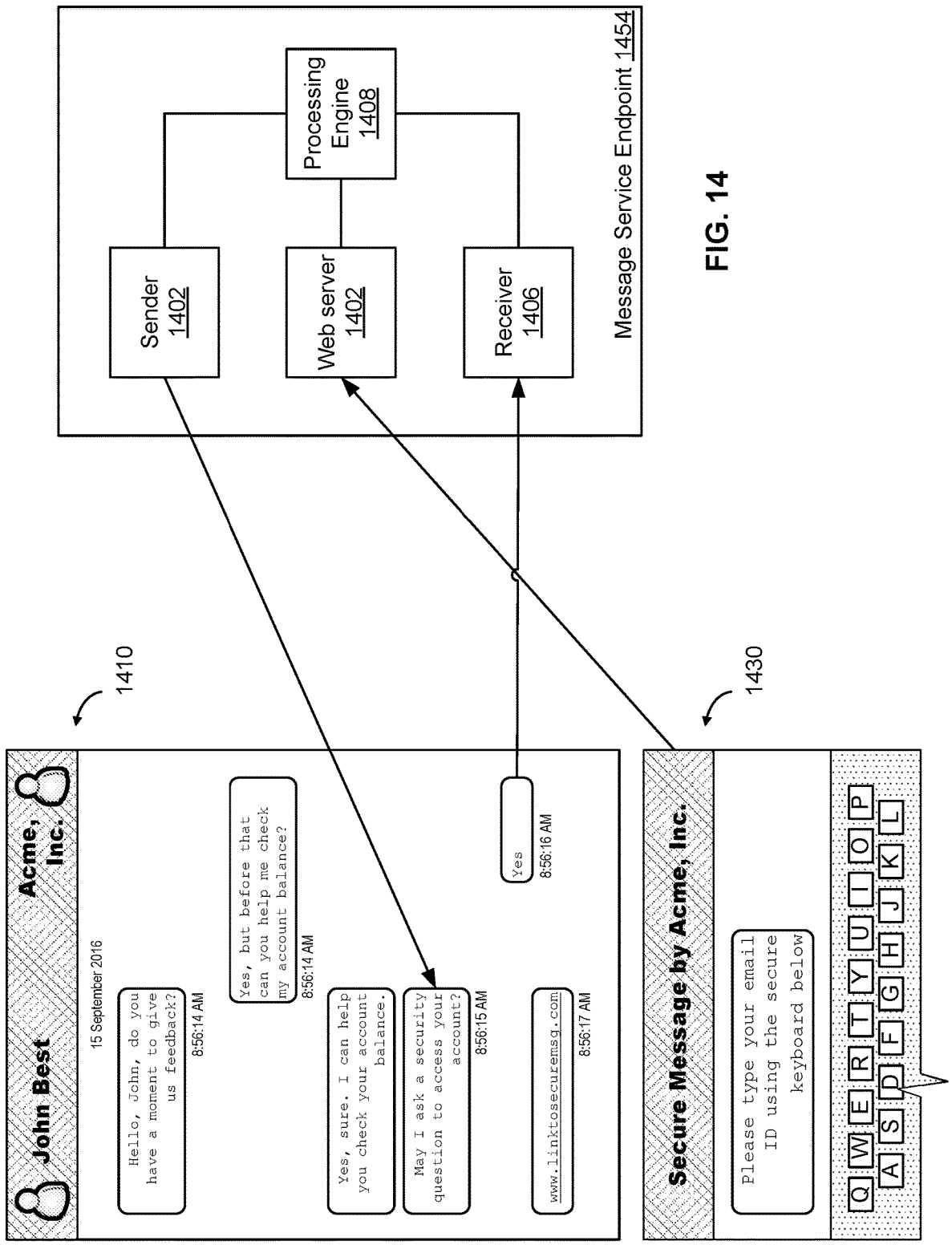
FIG. 14 is an example graphical user interface (GUI) for displaying a non-embedded secure window.

Another example of access data is a link, token, and the like presented within the messaging service specific application. FIG. 14 shows an example where a URL link (www.linktosecuremsg.com) represents the access data. The user can select the link to initiate and exchange information over a secure channel. The link may include access tokens, session identifiers, or the like to re-direct the user to an application, browser, or secure window corresponding to the secure channel. In some embodiments, the link can be set to expire after a timeout period to prevent the link from being misused. An example of how an expired link is handled is discussed in FIG. 15.

In some embodiments, the process further includes establishing the secure channel. The data transported over the secure channel can be encrypted, for example using AES or higher encryption. Additional encryption can be added for example using an additional or dedicated Web application. For example, the secure channel is established between the message service endpoint and client device over a transport layer using a standard protocol such as TLS, SSL, and the like. As discussed with respect to FIG. 5, the secure channel secures the information exchanged through the channel by not allowing any information to be stored on third party servers. Although the secure channel is separate from the default channel, the user experience is seamless. For example, the secure channel can be associated with a default channel using a session ID, so when the secure channel is closed, the GUI of the client device is automatically refreshed to bring the user back to the message app associated with the default channel.

The following figure is a more detailed example of a process for secure messaging integration.

Figure 8:
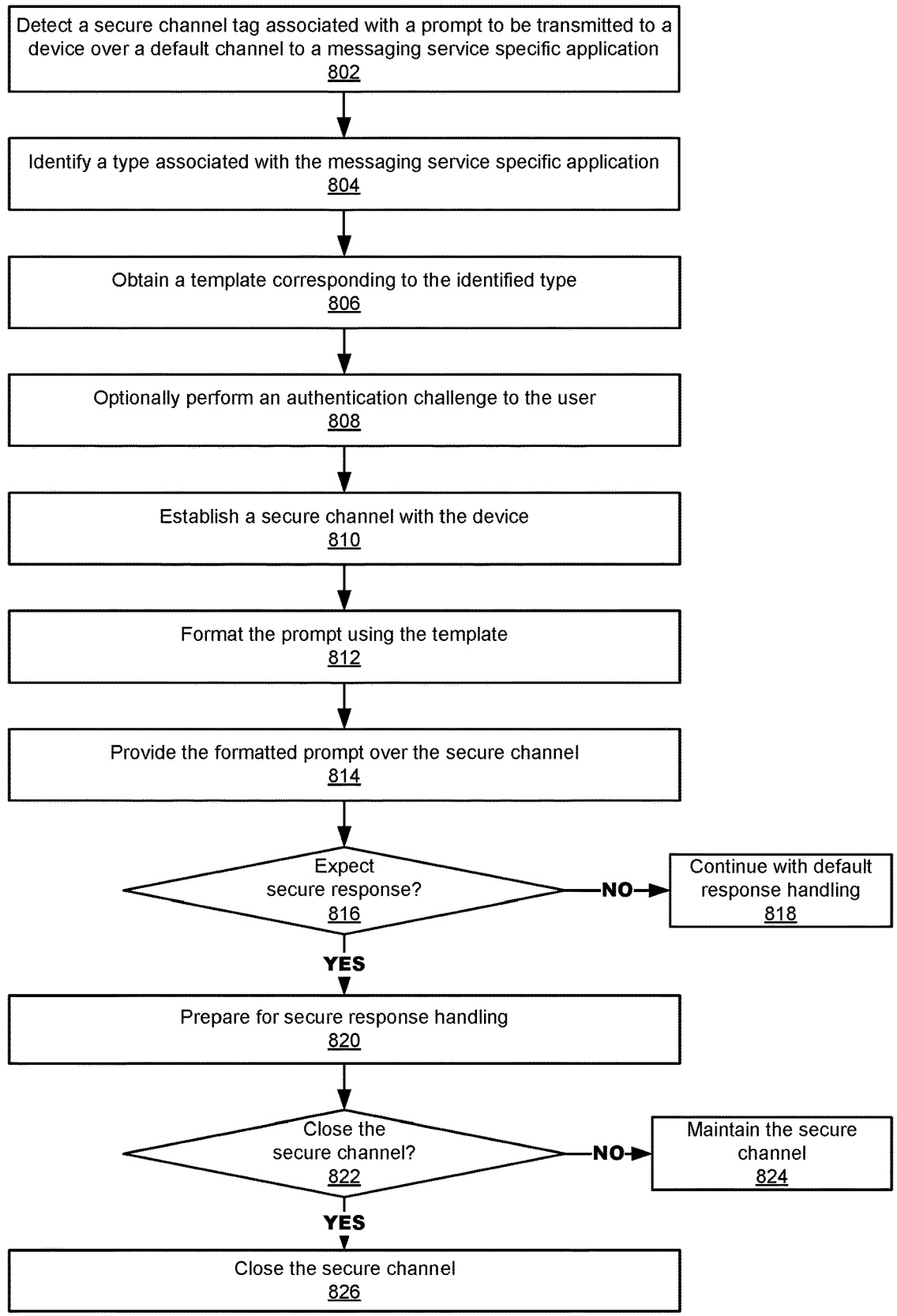
FIG. 8 is a flow chart illustrating an embodiment of a process for secure messaging integration with messaging applications.

FIG. 8 is a flow chart illustrating an embodiment of a process for secure messaging integration with messaging applications. A message service endpoint such as the one shown in FIG. 2 can perform this process. In this example, 802 is an example of identifying a trigger event (702) and 814 is an example of sending access data (704).

At 802, the process detects a secure channel tag associated with a prompt to be transmitted to a device over the default channel to the messaging service specific application. As discussed with respect to FIGS. 3 and 4, a conversation with a user can proceed according to a pre-formulated conversation script made up of dialogs. A dialog can have a tag indicating that it involves a secure channel. When the process of FIG. 8 is monitoring an interaction in the messaging service specific application, it may detect that a dialog about to be served to the user includes a secure channel tag. If the secure channel tag is detected, then the process will proceed to prepare to exchange sensitive information.

Referring to FIG. 9, window 910 shows a GUI of a message app where information is being exchanged over a default channel. When the user, John Best, asks Acme "Yes, but before that can you help me check my account balance?" This is a trigger event causing the process to detect a secure channel tag. Alternatively, when Acme responds, "Yes, sure. I can help you check your account balance," the process detects a secure channel tag because the checking account balance can be tagged as involving a secure channel. At any rate, before John Best and Acme exchange account balance related information including any authentication steps to access account details, a secure channel is established so that the exchange can take place over the secure channel instead of the default channel.

Returning to FIG. 8, at 804, the process identifies a type associated with the messaging service specific application. The type of the messaging service specific application indicates how to format prompts for the messaging service specific application. Each type of message app has a protocol associated with it, and a protocol adapter (e.g., 210) can adapt information for the type of message app. For example, options can be presented in a way specific to the type of message app (e.g., three buttons in a row), as further described with respect to FIG. 2.

At 806, the process obtains a template corresponding to the identified type. The template is associated with a type and can be used to format information for a specific message app. A template may specify parameters such as the allowed number of lines of text, height of windows, whether multimedia is supported, etc. The template may be provided by the message app via an API or developed based on features and functionalities of a specific type of message app.

Figure 11:
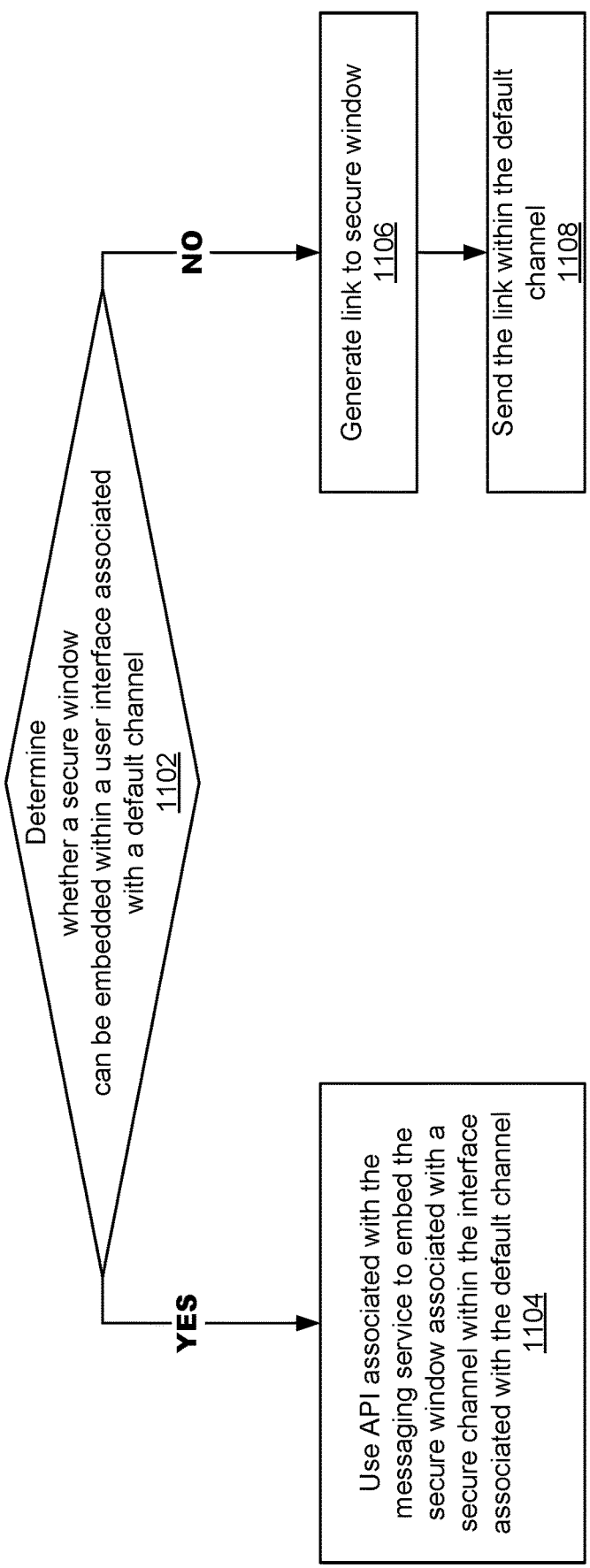
FIG. 11 is a flow chart illustrating an embodiment of a process for establishing a secure channel including how messages are displayed.

At 810, the process establishes a secure channel with the device. The secure channel is a separate channel from a default channel and communications over the secure channel are not visible to the default channel, as further described with respect to FIG. 5. Establishing the secure channel may include informing a user of the availability of the channel, for example, by sending a link, presenting an embedded secure window, etc. FIG. 11 describes an example of establishing a secure window corresponding to the secure channel.

At 812, the process formats the prompt using the template. The prompt (sometimes called "dialog") of a conversation is formatted using the template to adapt the prompt for a specific type of message app. For example, if a message app supports the presentation of options in a drop down menu, the template will indicate this feature and the prompt is formatted using the template to present selections in a drop down menu.

At 814, the process provides the formatted prompt over the secure channel. The formatted prompt can be provided over the secure channel within a secure window, which can be embedded within the message app or separate from the message app. Referring to secure window 1210 of FIG. 12D, the prompt includes options of "Make Payment," "Recent Transactions," and "Talk to Customer Support." These options have been formatted for the message app by making them selectable buttons. Another type of message app that does not support presentation of options by selectable buttons may instead display, "Press 1 for Make Payment, Press 2 for Recent Transaction, Press 3 for Talk to Customer Support."

Returning to FIG. 8, at 816, the process determines that a secure response is expected. Example Table 1 above lists some rules associated with a dialog/conversation that can dictate whether a secure response is expected/needed for prompt. In some embodiments, a secure response is not expected and, if so, the process need not listen for a secure response and may simply continue with default response handling 818 and/or close the secure channel. For example, if the process is simply serving secure content and this information is expected to be the end of the interaction, then a secure response is not expected. On the other hand, a secure response would be expected when a question is made such as "Please enter your PIN."

If a secure response is expected, the process proceeds to 820 in which it prepares for the secure response handling. In some embodiments, preparing for secure response handling includes creating a web endpoint for interaction with a user for a current session associated with the secure channel and sending a message to the user to display a message about the system's readiness for secure response handling. Session information can be saved to an in-memory data structure store such as Redis, which allows a web server to serve the information. Then, information that can be used to display a secure handling message can be sent to the user. For example, a secure web popup can signal to the user that the system will be receiving and processing responses over a secure connection. Referring to FIG. 6, secure response handling corresponds to receiver 608 and secure channel dialog template 612. To expedite processing, the process may fetch templates anticipated to be used for an expected secure response.

Returning to FIG. 8, at 822 the process determines whether to close a secure channel. For example, the process may detect that the secure channel is no longer needed when the customer is satisfied with the exchange. When asked "Is there anything else I may help with today?" and the customer responds, "No, thanks," the process will determine that the secure channel can be closed. Another example is a timeout period. A secure channel can be closed after a period of inactivity or after being open for a period time. When the timeout period (which can be pre-defined) has passed, then the process will close the secure channel. If the secure channel is to be closed, the process proceeds to 826, in which the secure channel is closed. In some embodiments, in response to closing the secure channel, the process automatically closes an application (e.g., a secure window that is embedded within the message app chat interface or a secure window that is separate from the message app chat interface) in which the access data is presented. Automatically closing the secure window also has the advantage of hiding the sensitive data that is either sent to the user and/or input by the user into the secure window. Otherwise, if the secure channel is not to be closed, the process maintains the secure channel (824). In some embodiments, the process may periodically present messages such as "Excuse me, are you still there?"

In some embodiments, prior to establishing a secure channel with the device (810), an authentication challenge is performed (808). The authentication challenge may increase protection of information by adding an additional check. For example, the authentication challenge can verify the identity of the user. If some time has elapsed, someone else may have control over the user's phones, and the authentication challenge provides another layer of security by verifying the intended recipient. FIG. 9 illustrates an example of an authentication challenge.

FIG. 9 is a block diagram illustrating an embodiment of a message service endpoint configured for an authentication challenge. An authentication challenge may be sent to a client device (here, phone 920) as part of a secure messaging integration process such as the one shown in FIG. 8. The authentication challenge may include a conventional process such as two-factor authentication.

FIG. 9 shows a message service endpoint 954, phone 920, and graphical user interfaces 910 and 930. Each of the components of endpoint 954 correspond to the ones shown in FIG. 2. In some embodiments, the phone 920 is the same as client device 520 of FIG. 5, meaning that GUIs 910 and 930 are displayed in the same device used for the authentication challenge. In some embodiments, the phone 920 is a different device from the client device hosting the message app. For example, GUIs 910 and 930 may be displayed on a tablet and the phone is a separate device used for the authentication challenge.

For example, a user may choose to receive a phone call, text message, or the like at phone 920 to validate her identity or receive further instructions about the authentication challenge. Instructions or a conversation for authentication can be implemented by Web server 902 in cooperation with protocol adapter 210, and/or integration apps 152. As described in greater detail above, the protocol adapter formats a message for a recipient and the integration app may be an automated chatbot carrying out a conversation according to a conversation script.

In this example, the authentication challenge process is initiated when sender 904 (Acme, Inc.) asks the user (John Best), "May I ask a security question to access your account?" When John responds in the affirmative (noted by receiver 906), a secure channel is set up and messages transmitted over the secure channel show up in secure window 930. Acme asks John to type in an email ID, and John does. Acme then asks John for his preferred method of verifying his identity. John elects to receive a phone call for two factor authentication. Web server 902 receives this instruction and places a phone call to phone 920 with additional instructions. For example, a code may be read to John over the phone. John enters this code at GUI 930, and this completes the two factor authentication.

FIG. 9 is also an example where access data is presented in a secure window 930 separate from a window 910 associated with the messaging service specific application. The secure window 930 may instead be embedded in a message app such as in FIG. 12B and 12D if the message app supports embedded windows. The following figure shows a process corresponding to FIG. 9.

Figure 10A:
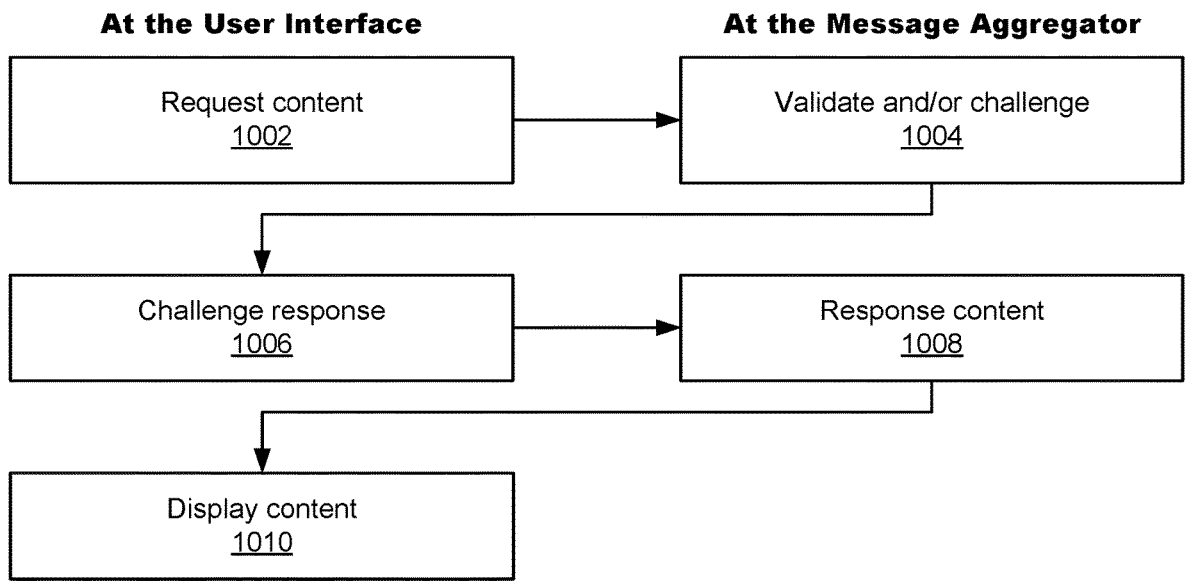
FIG. 10A is a flow chart illustrating an embodiment of a process for an authentication challenge to display secure content.

FIG. 10A is a flow chart illustrating an embodiment of a process for an authentication challenge to display secure content.

At 1002, content is requested at a user interface. Referring to FIG. 9, the request for content is John asking to check his account balance. The message aggregator (more specifically, the message service endpoint 954) receives the request and initiates a validation and/or challenge process (1004). In the example of FIG. 9, the validation is asking for the email ID, and the challenge is the two factor authentication in which John specifies his preference is receiving a phone call. When John inputs the code received in the phone call, he provides the challenge response (1006), and the message aggregator checks the response content (1008). If the authentication challenge is successfully completed, then content is sent to the user interface and displayed (1010).

Figure 10B:
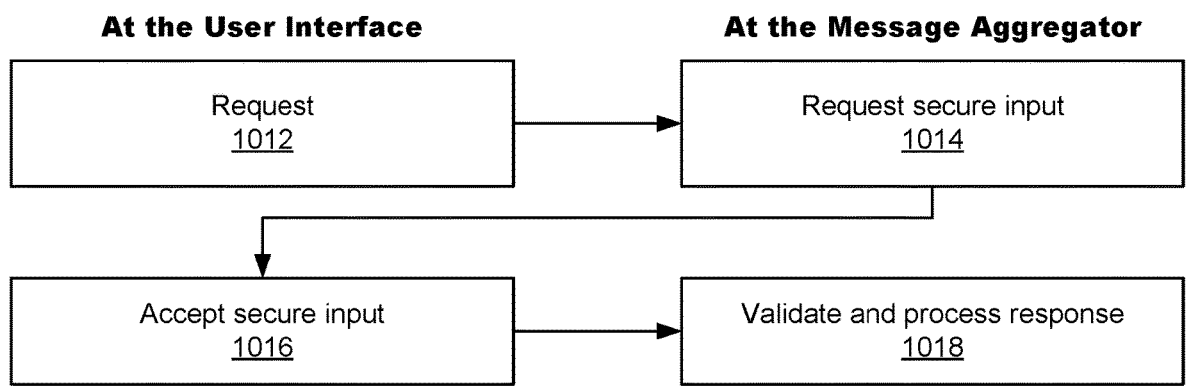
FIG. 10B is a flow chart illustrating an embodiment of a process for an authentication challenge for receiving secure input.

FIG. 10B is a flow chart illustrating an embodiment of a process for an authentication challenge for receiving secure input.

At 1012, a request is made at the user interface. Referring to FIG. 9, the request is John asking to check his account balance. The message aggregator receives the request for secure input (1014) and prompts John for more information. John accepts (1016), and the message aggregator proceeds with a validation and response process (1018) such as the one described with respect to FIG. 10A.

FIG. 11 is a flow chart illustrating an embodiment of a process for establishing a secure channel including how messages are displayed. A message service endpoint such as the one shown in FIG. 2 can perform this process. Messages exchanged over a secure channel are displayed differently from messages exchanged over a default channel. The display can be in a seamless manner that makes a user feel like she has not left the message app, while at the same time providing confidence that the communications are being made in a secured manner different from default communications.

One way to display secure communications is in an embedded secure window. Messaging apps such as Facebook® Messenger provide APIs that allow a window to be embedded in its user interface in the manner shown in FIG. 12B. Secure window 1210, which includes its own keyboard, is embedded in the message app so that a user feels like he is still using the message app. However, the messages and the input (via keyboard) are not visible to the message app, and the messages are also not transmitted through the message app server. Instead these messages are exchanged over a secure channel directly between the client device and the message service endpoint.

Another way to display secure communications is in a separate secure window such as a Web browser as shown in FIG. 14. The window can be a pop-up or the display rearranged to display part of the message app and part of the secure window. To determine how to display the secure window (e.g., embedded or non-embedded), the process of FIG. 11 begins by determining whether a secure window can be embedded within a user interface associated with a default channel (1102). The process can determine this capability based on the functionalities of a messaging service specific app, for example, as provided by an API. As another example, the process can determine this capability based on a template associated with the messaging service. Not all message apps support embedded windows, but those that do typically provide an API for controlling how the embedded window looks such as its height or proportion of a device screen taken up by the embedded window. If a message app supports embedded windows, then the process determines that a secure window can be embedded within a user interface associated with a default channel and proceeds to 1104.

At 1104, the process uses an API associated with the messaging service to embed the secure window associated with a secure channel within the interface associated with the default channel. The API may allow parameters to specify how the secure window looks (size, location) inside the interface associated with the default channel (the message app). FIG. 12B shows an example of a security window embedded inside a message app, where the message app is the interface associated with the default channel Otherwise, if a secure window cannot be embedded, then the process generates a link to a secure window (1106). A user can select the link to be directed to a secure window in which secure content is exchanged over the secure channel. The link is sent within the default channel (e.g., a message app). FIG. 14 shows an example where a link (www.link-tosecuremsg.com) is sent. When the link is selected, secure window 1430 is rendered.

The following figures show transition between displaying default (non-secure) data to secure data and back to default data.

Figure 12A:
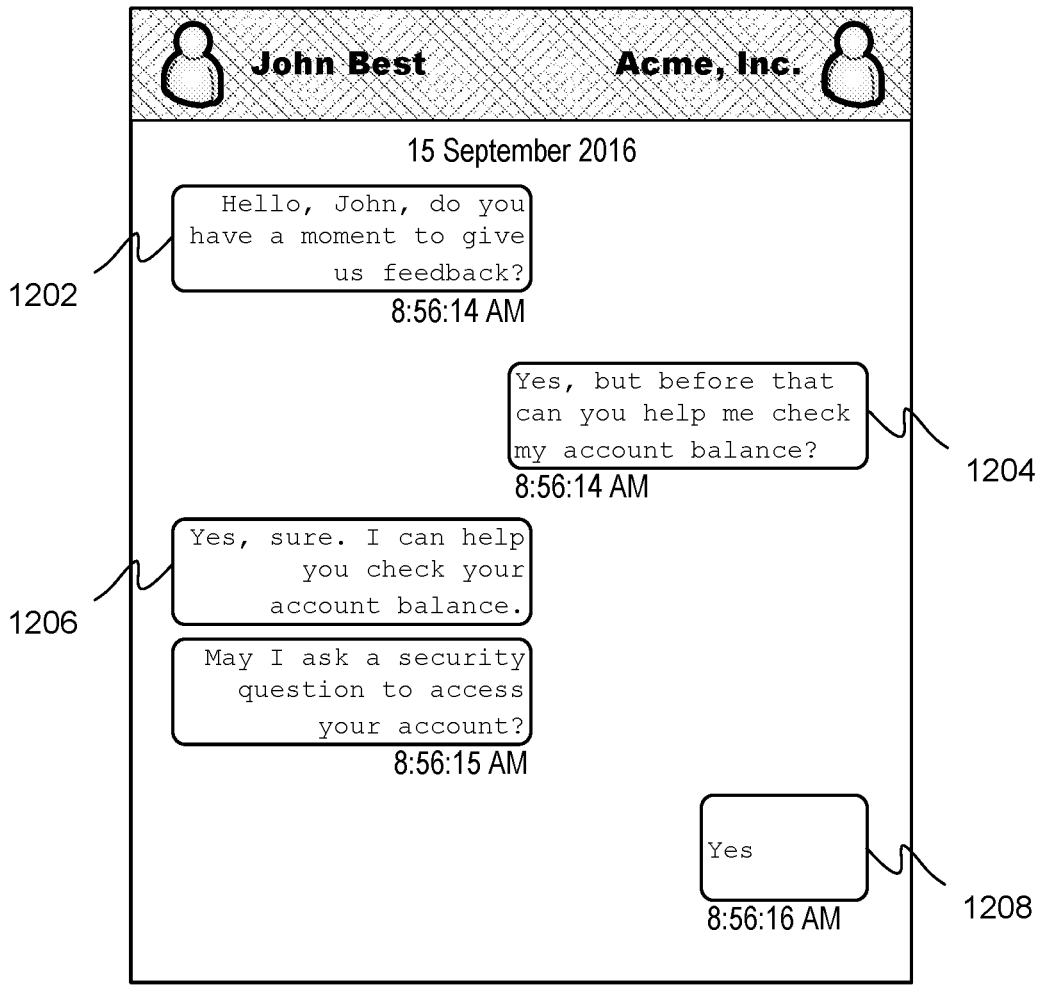
FIG. 12A is an example graphical user interface (GUI) for displaying default data.
Figure 12B:
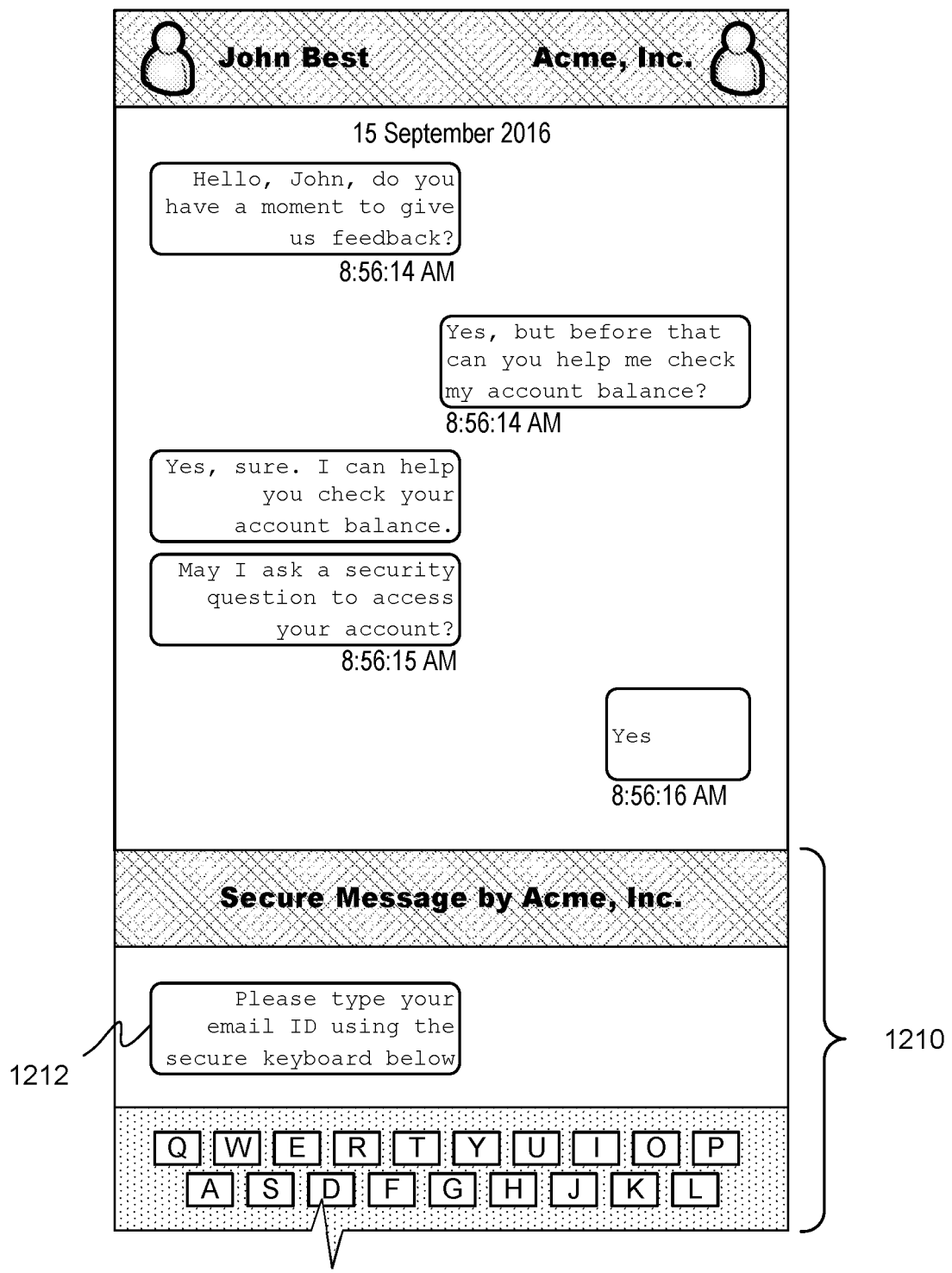
FIG. 12B is an example graphical user interface (GUI) for displaying secure data.

FIG. 12A is an example graphical user interface (GUI) for displaying default data. Here, a user (John Best) is chatting with Acme, Inc. The conversation takes place over a default channel. Referring to FIG. 5, the messages shown here are sent over default channel 514.1 and 514.2. Returning to FIG. 12A, Acme sends message 1202 asking for feedback, to which John replies with message 1204 asking to check his balance. Acme responds with message 1206 asking John if he's ready to answer a security question to access his account. When John responds in the affirmative (1208), communications thereafter take place over a secure channel because (potentially) sensitive information is expected to be exchanged.

FIG. 12B is an example graphical user interface (GUI) for displaying secure data. This shows an example in which access data is presented as an embedded secure window in the messaging service specific application. The embedded window can mimic the look and feel of the message app to help the user feel that he is still using the message app. Displaying an embedded window also allows the user to interact with earlier messages in the message app such as old links. However, sometimes links may expire and be handled as further described with respect to FIG. 15. In other embodiments, the access data may instead be presented in a separate window, e.g., as shown in FIG. 9.

The embedded secure window 1210 includes a keyboard, and Acme sends message 1212 asking John to use the keyboard to type his email ID.

Figure 12C:
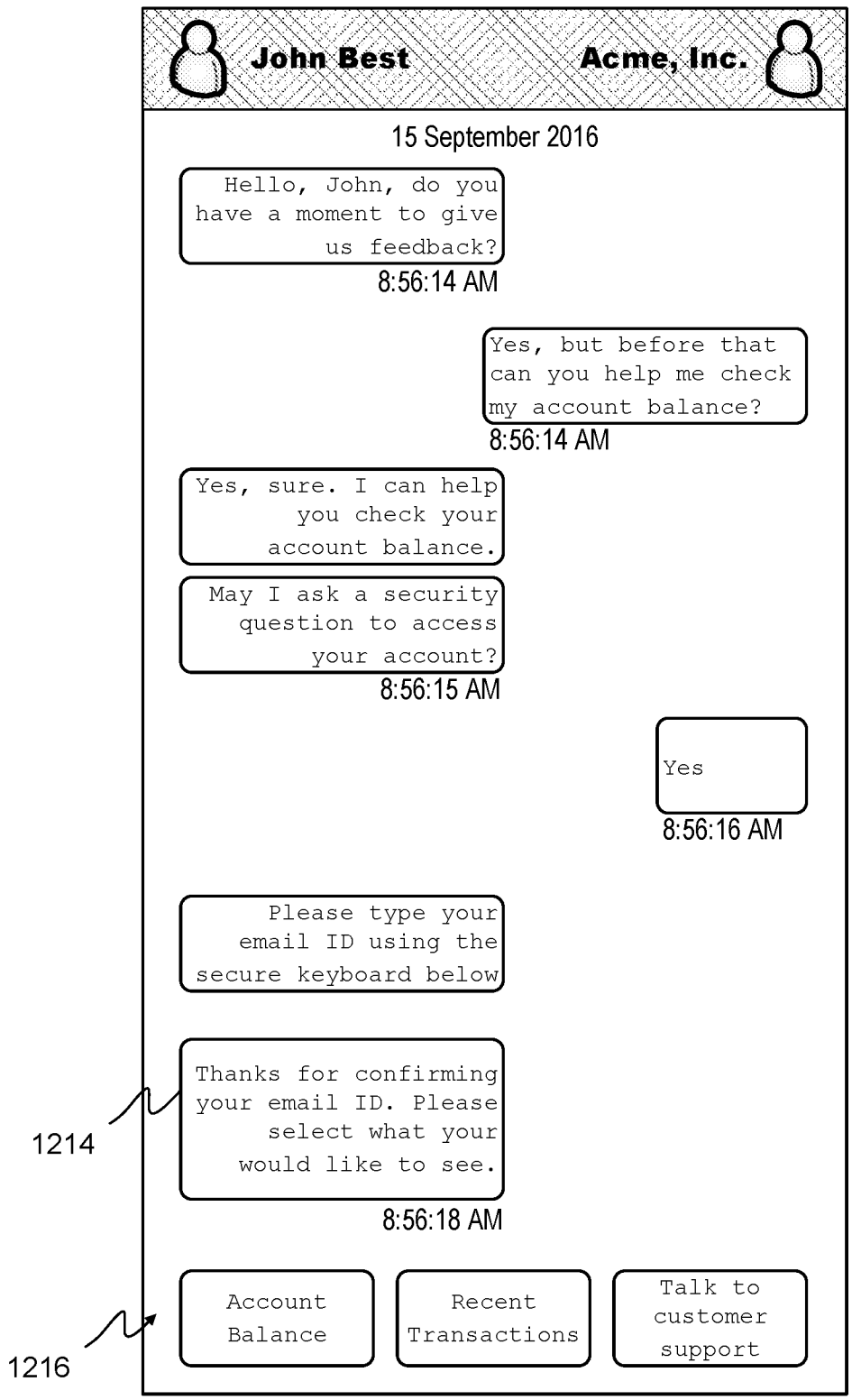
FIG. 12C is an example graphical user interface (GUI) for displaying default data.

FIG. 12C is an example graphical user interface (GUI) for displaying default data. This example shows a message app after an exchange of secure content has taken place. Here, John has typed his email ID and the secure window is automatically closed. Any messages exchanged through the secure window (over the secure channel) are not visible to the message app. Thus, the next message is 1214, in which Acme thanks John for entering his verification email ID and offers him a few options 1216 for how to proceed. Selecting some of the options causes a secure window to be rendered again (a secure channel is established again). For example, if John wishes to view his account balance or recent transactions, this sensitive information would be displayed in a secure window like the one shown in FIG. 12B. If John asks to talk to customer support, this does not necessarily cause a secure window to be displayed. For example, the conversation up to this point may be conducted by an automated chatbot, but if John requests customer support, a live agent may step in. Suppose John asks to see his account balance. In response, the GUI of FIG. 12D is rendered.

Figure 12D:
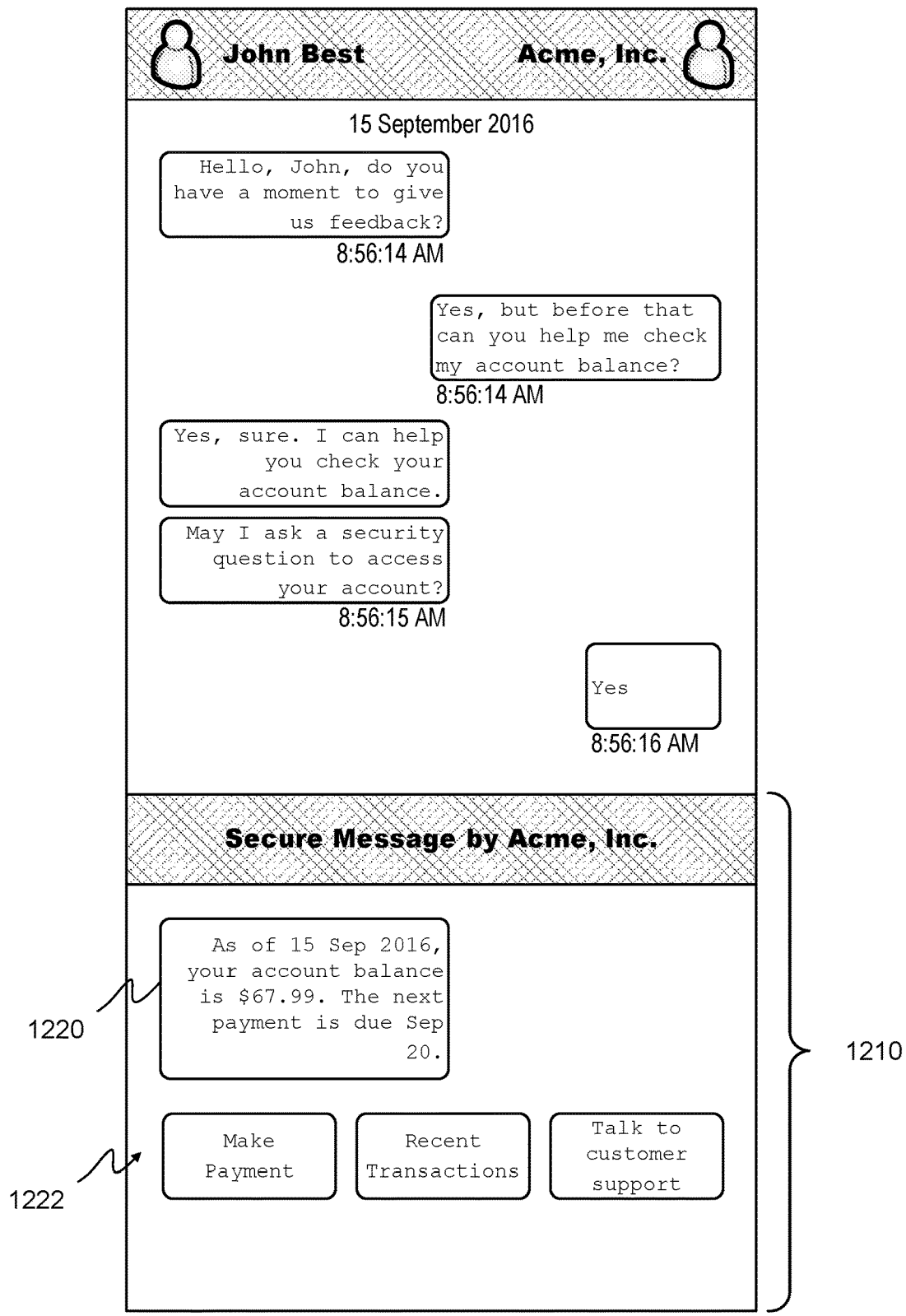
FIG. 12D is an example graphical user interface (GUI) for displaying secure data.

FIG. 12D is an example graphical user interface (GUI) for displaying secure data. Secure window 1210 displays the information that John requested (1220) and presents some options 1222. In each FIGS. 12B and 12D, the secure window is embedded inside a message app associated with a default channel. The following figure describes this mechanism in greater detail.

Figure 13:
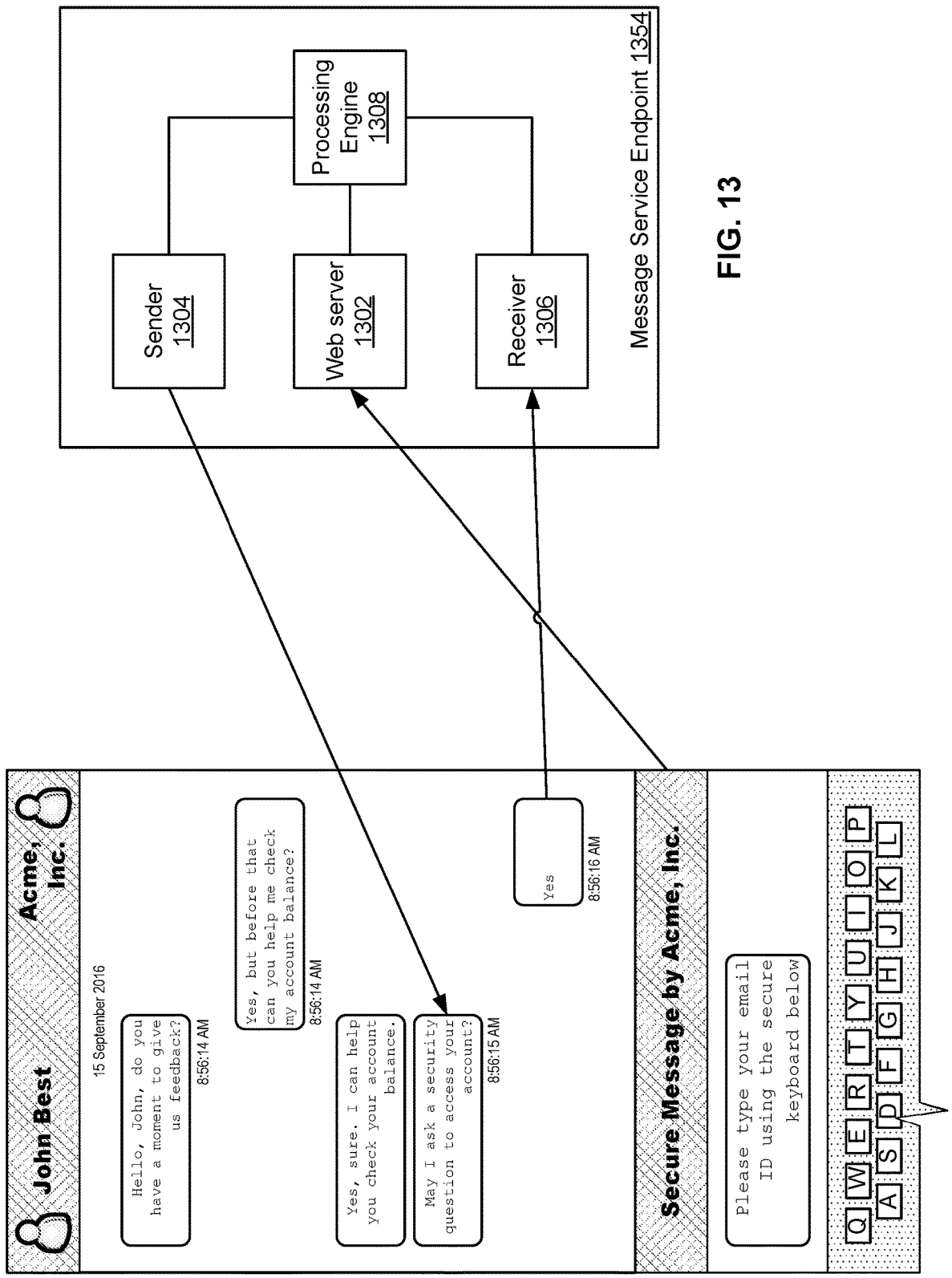
FIG. 13 is an example graphical user interface (GUI) for displaying an embedded secure window.

FIG. 13 is an example graphical user interface (GUI) for displaying an embedded secure window. FIG. 13 shows a GUI of a message app with an embedded secure window along with a message service endpoint 1354 that handles interactions with the GUI. The components of the message service endpoints are like their counterparts in FIG. 2. Here, sender 1304 is configured to send messages to John on the message app such as the message regarding asking a security question. Responses such as John's agreement to being asked a security question is handled by receiver 1306. Web server 1302 sets up a secure channel and is responsible for the exchange of messages over the secure channel, which is represented by the secure window.

Messages exchanged over the secure channel can be represented in a separate (rather than embedded) secure window. For example, some message apps do not support embedded windows. The following figure shows an example for displaying a separate secure window.

FIG. 14 is an example graphical user interface (GUI) for displaying a non-embedded secure window. Each of the components are like the ones described in FIG. 13. The difference from FIG. 13 is that secure window 1430 is not embedded in window 1410. Instead, a secure window may be automatically opened, or selecting the link (www.linktosecuremsg.com) causes window 1430 to be opened. The window can be displayed alongside GUI 1410 or can replace at least part of the message app (e.g., a pop-up).

Figure 15:
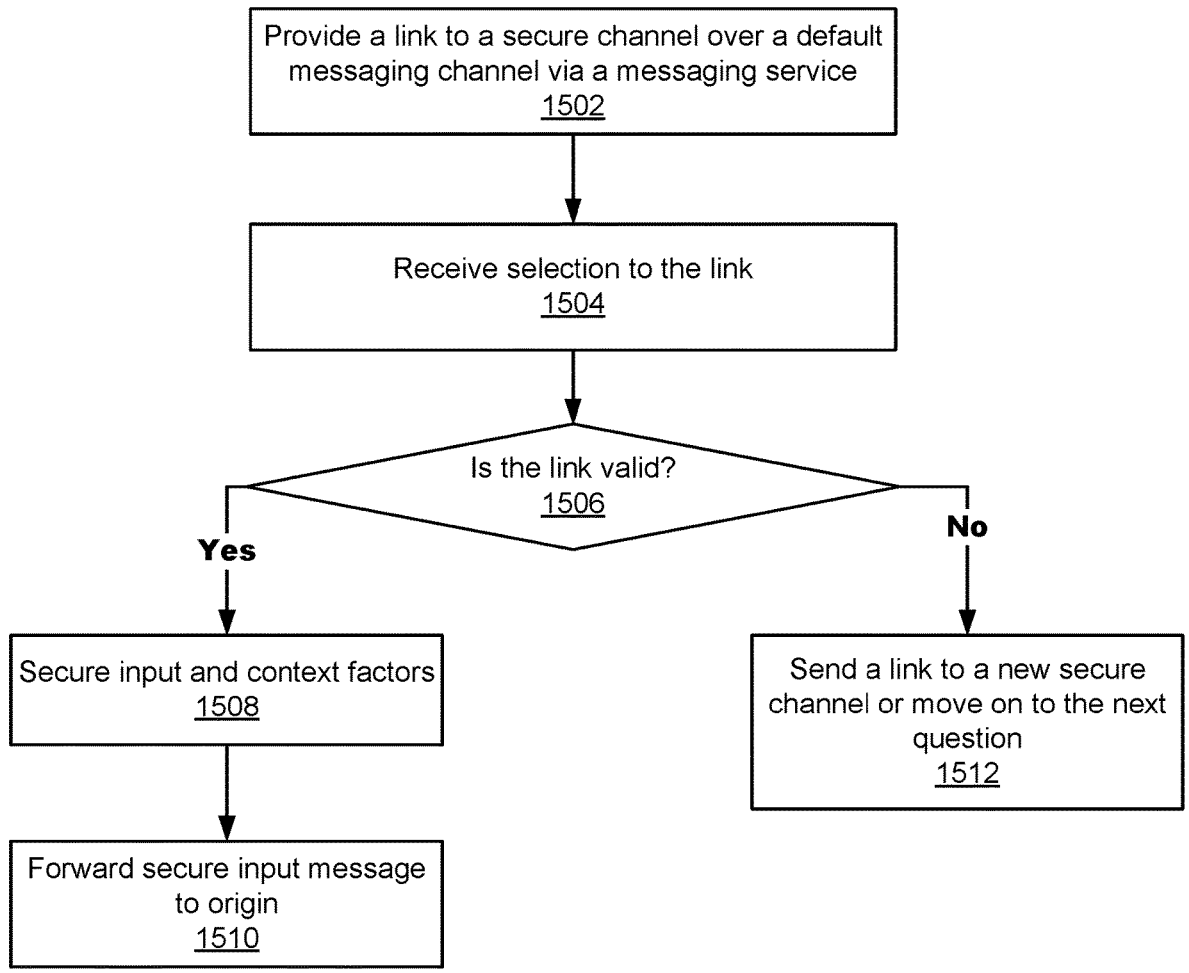
FIG. 15 is a flow chart illustrating an embodiment of a process for providing access to a secure window from a link.

FIG. 15 is a flow chart illustrating an embodiment of a process for providing access to a secure window from a link. For example, a message service endpoint such as the one shown in FIG. 2 can perform this process.

At 1502, the process provides a link to a secure channel over a default messaging channel via a messaging service. The link is an example of access data that can be used to access a secure channel. The link such as a URL can be selected to communicate over a secure channel. An example of a link is further described with respect to FIG. 14.

At 1504, the process receives a selection to the link. For example, a user double clicks or taps the link to select the link, and this selection is received at a message service endpoint.

At 1506, the process determines whether the link is valid. Link expiration assures that a message is accessed by a targeted user. A link may be invalid if access data associated with the link has expired. The expiration period can be pre-defined or set by an administrator. For example, a link may expire after five minutes. When the process receives selection of an expired link, the process may determine that the link has expired because the link does not exist on a message queue. Valid links may be stored in a shared memory such as processing engine 508. For example, valid links are cached in the shared memory with the chat's session ID. The process can check the shared memory for whether a valid link exists for the current chat session.

In some embodiments, in response to a determination that the access data has expired, the process requests a new set of access data (e.g., a fresh link) in response to a request for the access data. For example, the process passes an intention key to a conversation engine to request a new link or interaction. A new link can be generated to provide access.

In some embodiments, a user may be asked to authenticate prior to receiving the new link. In some embodiments, when the process determines that the access data (link) has expired, the process proceeds to a next message or interaction. For example, a user might have asked to check her bank account 30 minutes ago, but is now no longer interested. The handling of expired links can be defined by rules indicating number of retries, time out period, etc.

The components (e.g., message service endpoint, protocol adapter, processing engine, etc.) described above can be implemented by a programmed computer system such as the one shown in the following figure.

Figure 16:
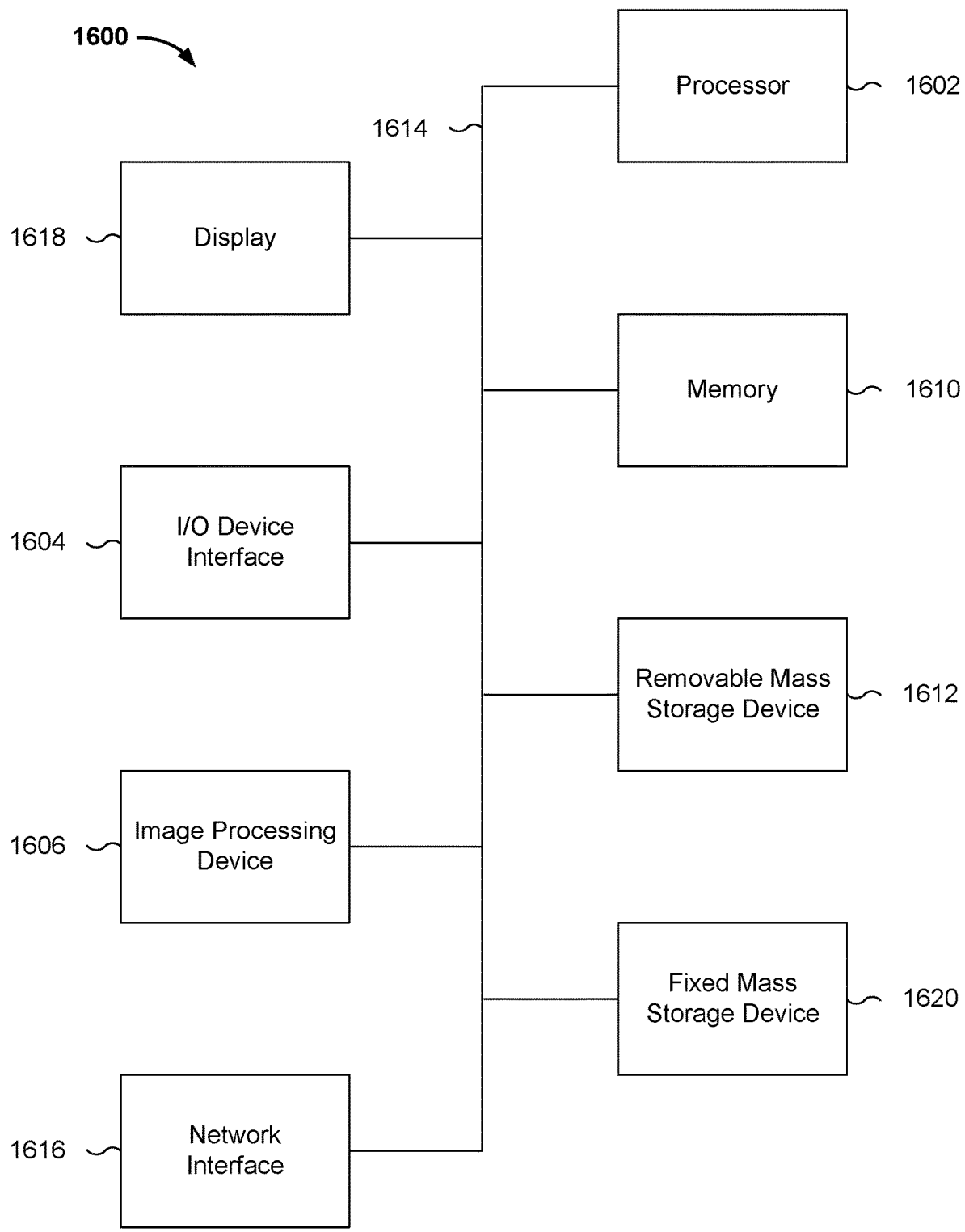
FIG. 16 is a functional diagram illustrating a programmed computer system for secure messaging integration with messaging applications in accordance with some embodiments.

FIG. 16 is a functional diagram illustrating a programmed computer system for secure messaging integration with messaging applications in accordance with some embodiments. As will be apparent, other computer system architectures and configurations can be used to perform the described secure messaging technique. For example, a message aggregator such as the one shown in FIG. 1 can be implemented by system 1600.

Computer system 1600, which includes various subsystems as described below, includes at least one microprocessor subsystem (also referred to as a processor or a central processing unit (CPU) 1602. For example, processor 1602 can be implemented by a single-chip processor or by multiple processors. In some embodiments, processor 1602 is a general purpose digital processor that controls the operation of the computer system 1600. In some embodiments, processor 1602 also includes one or more coprocessors or special purpose processors (e.g., a graphics processor, a network processor, etc.). Using instructions retrieved from memory 1610, processor 1602 controls the reception and manipulation of input data received on an input device (e.g., image processing device 1606, I/O device interface 1604), and the output and display of data on output devices (e.g., display 1618).

Processor 1602 is coupled bi-directionally with memory 1610, which can include, for example, one or more random access memories (RAM) and/or one or more read-only memories (ROM). As is well known in the art, memory 1610 can be used as a general storage area, a temporary (e.g., scratch pad) memory, and/or a cache memory. Memory 1610 can also be used to store input data and processed data, as well as to store programming instructions and data, in the form of data objects and text objects, in addition to other data and instructions for processes operating on processor 1602. Also as is well known in the art, memory 1610 typically includes basic operating instructions, program code, data, and objects used by the processor 1602 to perform its functions (e.g., programmed instructions). For example, memory 1610 can include any suitable computer readable storage media described below, depending on whether, for example, data access needs to be bi-directional or uni-directional. For example, processor 1602 can also directly and very rapidly retrieve and store frequently needed data in a cache memory included in memory 1610.

A removable mass storage device 1612 provides additional data storage capacity for the computer system 1600, and is optionally coupled either bi-directionally (read/write) or uni-directionally (read only) to processor 1602. A fixed mass storage 1620 can also, for example, provide additional data storage capacity. For example, storage devices 1612 and/or 1620 can include computer readable media such as magnetic tape, flash memory, PC-CARDS, portable mass storage devices such as hard drives (e.g., magnetic, optical, or solid state drives), holographic storage devices, and other storage devices. Mass storages 1612 and/or 1620 generally store additional programming instructions, data, and the like that typically are not in active use by the processor 1602. It will be appreciated that the information retained within mass storages 1612 and 1620 can be incorporated, if needed, in standard fashion as part of memory 1610 (e.g., RAM) as virtual memory.

In addition to providing processor 1602 access to storage subsystems, bus 1614 can be used to provide access to other subsystems and devices as well. As shown, these can include a display 1618, a network interface 1616, an input/output (I/O) device interface 1604, an image processing device 1606, as well as other subsystems and devices. For example, image processing device 1606 can include a camera, a scanner, etc.; I/O device interface 1604 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 1600. Multiple I/O device interfaces can be used in conjunction with computer system 1600. The I/O device interface can include general and customized interfaces that allow the processor 1602 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 1616 allows processor 1602 to be coupled to another computer, computer network, or telecommunications network using a network connection as shown. For example, through the network interface 1616, the processor 1602 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 1602 can be used to connect the computer system 1600 to an external network and transfer data according to standard protocols. For example, various process embodiments disclosed herein can be executed on processor 1602, or can be performed across a network such as the Internet, intranet networks, or local area networks, in conjunction with a remote processor that shares a portion of the processing. Additional mass storage devices (not shown) can also be connected to processor 1602 through network interface 1616.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 16 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 1604 and display 1618 share the touch sensitive screen component, which both detects user inputs and displays outputs to the user). In addition, bus 1614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method comprising:
  establishing a default messaging channel between a message aggregator and a message application executing at a client device;
  establishing a secure channel between the message aggregator and the client device, and wherein the default messaging channel is maintained to revert back to the default messaging channel when the secure channel is closed; and
  sending to the client device over the default messaging channel, access data usable to access the secure channel established between the message aggregator and the client device, wherein the access data is presented within the messaging application and communications over the secure channel are not visible to the default messaging channel.

2. The method of claim 1, wherein the secure channel is established in response to a message containing secure content.

3. The method of claim 2, further comprising identifying secure content including by detecting a secure channel tag in the message.

4. The method of claim 3, wherein a conversation template is created by:
  receiving an indication to build a conversation;
  receiving a prompt to be included in the conversation; and
  in response to a determination that the prompt involves secure content, storing the secure channel tag with the prompt.

5. The method of claim 1, further comprising establishing the secure channel in response to detecting a tag associated with a prompt.

6. The method of claim 1, wherein content transmitted over the secure channel does not pass through a server associated with the messaging service specific application.

7. The method of claim 1, wherein the secure channel has a session ID to associate the secure channel with the default messaging channel.

8. The method of claim 7, further comprising, in response to closure of the secure channel, at least one of reverting back to the default messaging channel and continuing a conversation on the default messaging channel.

9. The method of claim 1, wherein the default messaging channel and the secure channel are on different network communication layers.

10. The method of claim 1, further comprising:
  detecting a secure channel tag associated with a prompt to be transmitted to the client device over the default messaging channel to the messaging service specific application;
  identifying a type associated with the messaging service specific application;
  obtaining a template corresponding to the identified type;
  formatting the prompt using the template; and
  providing the formatted prompt over the secure channel.

11. The method of claim 1, further comprising:
  determining that a secure response is expected; and
  in response to the determination that a secure response is expected, preparing for secure response handling including by creating a web endpoint for user interaction in a current session associated with the secure channel and sending information for a secure handling message to be displayed.

12. The method of claim 1, wherein the access data is presented as an embedded secure window in the messaging service specific application.

13. The method of claim 1, wherein the access data is presented in a secure window separate from the messaging service specific application.

14. The method of claim 1, further comprising sending an authentication challenge to the client device.

15. The method of claim 1, further comprising automatically closing an application in which the access data is presented in response to closure of the secure channel.

16. The method of claim 1, further comprising:
  determining that the access data has expired; and
  in response to a request for the access data, sending a new set of access data.

17. The method of claim 1, further comprising determining that the access data has expired and proceeding to a next message.

18. A system comprising:
  a processor configured to:
    establish a default messaging channel between a message aggregator and a message application executing at a client device;
    establish a secure channel between the message aggregator and the client device, and wherein the default messaging channel is maintained to revert back to the default messaging channel when the secure channel is closed; and
    send to the client device over the default messaging channel, access data usable to access the secure channel established between the message aggregator and the client device, wherein the access data is presented within the messaging service specific application and communications over the secure channel are not visible to the default messaging channel; and
  a memory coupled to the processor and configured to provide the processor with instructions.

19. The system of claim 18, further comprising a conversation engine configured to create a conversation template including by:
  receiving an indication to build a conversation;
  receiving a prompt to be included in the conversation;
  determining that the prompt involves secure content; and
  in response to the determination that the prompt involves secure content, storing a secure channel tag with the prompt.

20. A computer program product embodied in a non-transitory computer readable storage medium and comprising computer instructions for:
- establishing a default messaging channel between a message aggregator and a message application executing at a client device;
- establishing a secure channel between the message aggregator and the client device, and wherein the default messaging channel is maintained to revert back to the default messaging channel when the secure channel is closed; and
- sending to the client device over the default messaging channel, access data usable to access the secure channel established between the message aggregator and the client device, wherein the access data is presented within the messaging service specific application and communications over the secure channel are not visible to the default messaging channel.

* * * * *